(12) United States Patent
Wang et al.

(10) Patent No.: US 12,120,202 B2
(45) Date of Patent: Oct. 15, 2024

(54) TELEMETRY SCHEME WITH A CONSTANT INSENSIBLE GROUP DELAY

(71) Applicant: HALLIBURTON ENERGY SERVICES, INC., Houston, TX (US)

(72) Inventors: Yadong Wang, Singapore (SG); Xiang Wu, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 680 days.

(21) Appl. No.: 17/382,732

(22) Filed: Jul. 22, 2021

(65) Prior Publication Data
US 2023/0022461 A1  Jan. 26, 2023

(51) Int. Cl.
*H04L 69/04* (2022.01)
*E21B 43/26* (2006.01)
*E21B 47/135* (2012.01)
*G06F 13/00* (2006.01)

(52) U.S. Cl.
CPC .............. *H04L 69/04* (2013.01); *E21B 43/26* (2013.01); *E21B 47/135* (2020.05); *G06F 13/00* (2013.01)

(58) Field of Classification Search
CPC ........ E21B 43/26; E21B 47/135; E21B 47/10; E21B 47/114; E21B 47/12; E21B 47/13; E21B 47/14; E21B 43/2607; G06F 13/00; H04L 69/04; H04L 41/145; H04L 43/0852; H04L 43/0876
See application file for complete search history.

(56) References Cited

U.S. PATENT DOCUMENTS

| 7,349,330 | B1 * | 3/2008 | Hayakawa | H04L 47/22 370/229 |
| 7,911,957 | B2 * | 3/2011 | Kim | H04L 47/6275 370/252 |
| 8,184,691 | B1 * | 5/2012 | Henson | H04N 19/12 380/255 |
| 8,381,057 | B2 * | 2/2013 | Peeters | H04L 1/1887 714/748 |
| 2004/0261101 | A1 * | 12/2004 | Iwamura | H04B 3/542 725/135 |

(Continued)

FOREIGN PATENT DOCUMENTS

CN        115804073 A  *  3/2023  ......... H04L 41/0816

OTHER PUBLICATIONS

International Search Report and Written Opinion for PCT Application No. PCT/US2021/043610 issued on Apr. 13, 2022, 9 pages.

*Primary Examiner* — Oanh Duong
(74) *Attorney, Agent, or Firm* — NOVAK DRUCE CARROLL LLP

(57) ABSTRACT

Aspects of the subject technology relate to systems and methods for optimizing telemetry schemes with a constant insensible group delay. Systems and methods are provided for receiving an acquisition including compressed data and dummy data from a downhole logging system, determining a prior decompressor queue size based on the acquisition for a plurality of time intervals, determining a decompressor data size based on the acquisition for the plurality of time intervals, and determining a delay where the prior decompressor queue size is continuously greater than or equal to the decompressor data size for the plurality of time intervals.

20 Claims, 12 Drawing Sheets

(56) References Cited

U.S. PATENT DOCUMENTS

| | | | |
|---|---|---|---|
| 2010/0168885 A1* | 7/2010 | Li | H04N 21/6543 |
| | | | 709/231 |
| 2012/0093027 A1* | 4/2012 | Asano | H04L 43/0894 |
| | | | 370/253 |
| 2014/0241270 A1 | 8/2014 | Tohzaka et al. | |
| 2015/0067436 A1 | 3/2015 | Hu et al. | |
| 2016/0248694 A1* | 8/2016 | Yanagita | H04L 47/72 |
| 2016/0290128 A1 | 10/2016 | Dugas | |
| 2017/0041881 A1* | 2/2017 | Won | H04W 52/223 |
| 2018/0041565 A1* | 2/2018 | Kumar | H04L 43/0852 |
| 2019/0316464 A1 | 10/2019 | Sarac et al. | |
| 2020/0073846 A1* | 3/2020 | Adiletta | G06F 13/105 |
| 2020/0125526 A1* | 4/2020 | Wiseman | G07C 5/008 |
| 2020/0392836 A1* | 12/2020 | Mohnke | E21B 47/26 |
| 2022/0150171 A1* | 5/2022 | Matthews | H04L 47/56 |

* cited by examiner

| $t$ | $Q^{Prior}_{compressor}(t)$ | $T_{non-dummy}(t)$ | $Q^{Post}_{compressor}(t)$ | $Q^{Prior}_{decompressor}(t)$ | $L(t-\tau)$ | $Q^{Post}_{decompressor}(t)$ |
|---|---|---|---|---|---|---|
| 1 | 210 | 200 | 10 | 200 | 0 | 200 |
| 2 | 210 | 200 | 10 | 400 | 210 | 190 |
| 3 | 230 | 200 | 30 | 390 | 200 | 190 |
| 4 | 210 | 200 | 10 | 390 | 220 | 170 |
| 5 | 210 | 200 | 10 | 370 | 180 | 190 |
| 6 | 260 | 200 | 60 | 390 | 200 | 190 |
| 7 | 460 | 200 | 260 | 390 | 250 | 140 |
| 8 | 510 | 200 | 310 | 340 | 400 | --- |

FIG. 9

| t | $Q^{prior}_{compressor}(t)$ | $T_{non-dummy}(t)$ | $Q^{post}_{compressor}(t)$ | $Q^{prior}_{decompressor}(t)$ | $L(t-\tau)$ | $Q^{post}_{decompressor}(t)$ |
|---|---|---|---|---|---|---|
| 1 | 210 | 200 | 10 | 200 | 0 | 200 |
| 2 | 210 | 200 | 10 | 400 | 0 | 400 |
| 3 | 230 | 200 | 30 | 600 | 210 | 390 |
| 4 | 210 | 200 | 10 | 590 | 200 | 390 |
| 5 | 210 | 200 | 10 | 590 | 220 | 370 |
| 6 | 260 | 200 | 60 | 570 | 180 | 390 |
| 7 | 460 | 200 | 260 | 590 | 200 | 390 |
| 8 | 510 | 200 | 310 | 590 | 250 | 340 |
| 9 | 510 | 200 | 310 | 540 | 400 | 140 |
| 10 | 510 | 200 | 310 | 340 | 250 | 90 |
| 11 | 410 | 200 | 210 | 290 | 200 | 90 |
| 12 | 360 | 200 | 160 | 290 | 200 | 90 |
| 13 | 280 | 200 | 80 | 290 | 100 | 190 |
| 14 | 230 | 200 | 30 | 390 | 150 | 240 |
| 15 | 210 | 200 | 10 | 440 | 120 | 320 |
| 16 | 170 | 170 | 0 | 490 | 150 | 340 |
| 17 | 200 | 200 | 0 | 540 | 180 | 360 |
| 18 | 250 | 200 | 50 | 560 | 160 | 400 |
| 19 | 270 | 200 | 70 | 600 | 200 | 400 |
| 20 | 270 | 200 | 70 | 600 | 250 | 350 |
| 21 | 220 | 200 | 20 | 550 | 220 | 330 |
| 22 | 160 | 160 | 0 | 490 | 200 | 290 |
| 23 | 230 | 200 | 30 | 490 | 150 | 340 |
| 24 | 270 | 200 | 70 | 540 | 140 | 400 |

FIG. 10

TELEMETRY SCHEME WITH A CONSTANT INSENSIBLE GROUP DELAY

TECHNICAL FIELD

The present technology pertains to optimizing telemetry schemes, and more particularly, to optimizing telemetry schemes with a constant insensible group delay.

BACKGROUND

Telemetry schemes can include data compression and typically require a real-time logging system to reduce data size and save telemetry bandwidth. The compressed data size can vary from acquisition to acquisition, but the telemetry bandwidth is usually fixed. Traditionally, a telemetry bandwidth is utilized that can accommodate a maximum data size among all acquisitions, resulting in an inefficient use of bandwidth for many of the acquisitions.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9 illustrates an example table of iterations utilizing a time delay of one second, in accordance with aspects of the present disclosure.

FIG. 10 illustrates an example table of iterations utilizing a time delay of two seconds, in accordance with aspects of the present disclosure.

DETAILED DESCRIPTION

Figure 1:
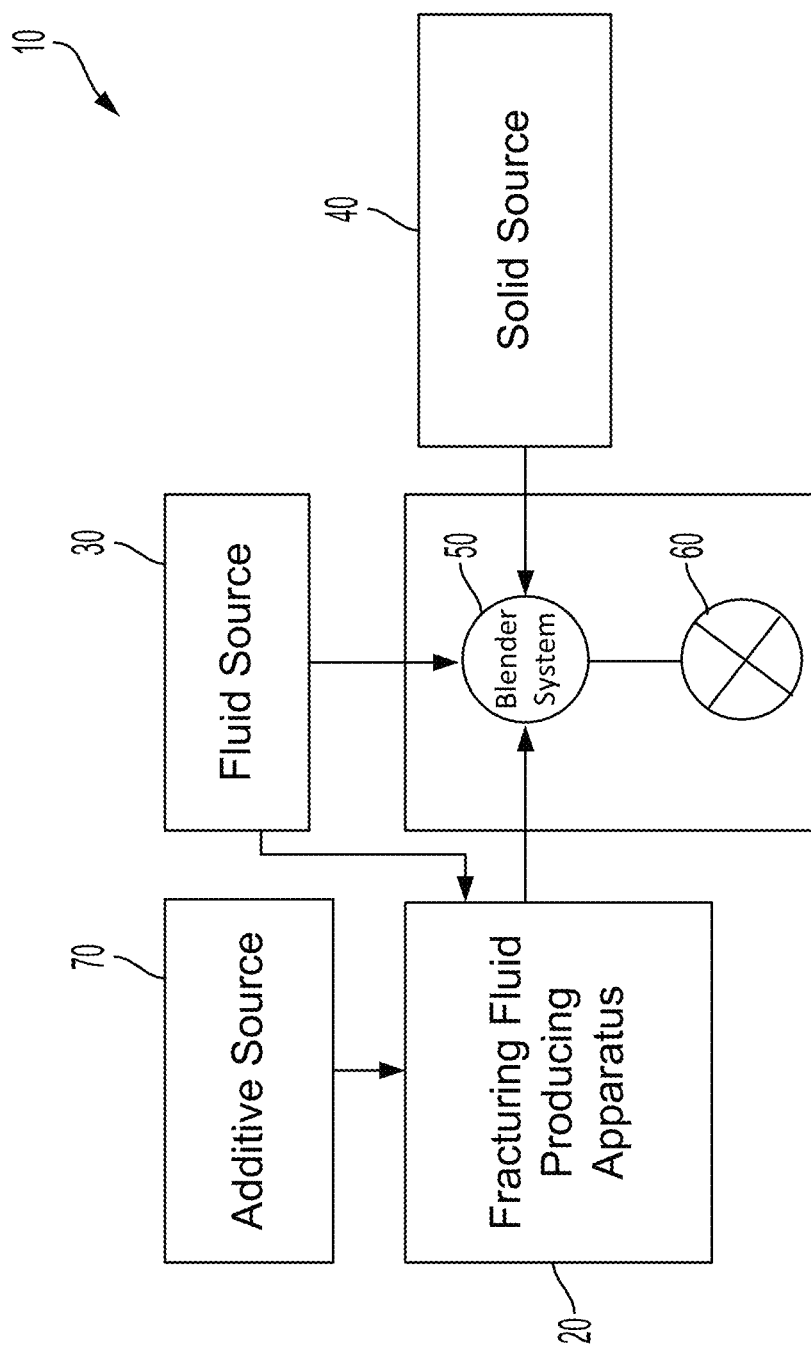
FIG. 1 illustrates a schematic diagram of an example fracturing system, in accordance with aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In various embodiments, a method for optimizing a telemetry scheme. The method can include receiving, at a surface logging system, an acquisition including compressed data and dummy data from a downhole logging system. The method can also include determining, by the surface logging system, a prior decompressor queue size based on the acquisition for a plurality of time intervals. The method can further include determining, by the surface logging system, a decompressor data size based on the acquisition for the plurality of time intervals. Additionally, the method can include determining, by the surface logging system, a delay where the prior decompressor queue size is continuously greater than or equal to the decompressor data size for the plurality of time intervals.

In various embodiments, a system for optimizing a telemetry scheme can include one or more processors and at least one computer-readable storage medium having stored therein instructions which, when executed by the one or more processors, cause the system to receive an acquisition including compressed data and dummy data from a downhole logging system. The instructions can further cause the system to determine a prior decompressor queue size based on the acquisition for a plurality of time intervals. The instructions can also cause the system to determine a decompressor data size based on the acquisition for the plurality of time intervals. Additionally, the instructions can also cause the system to determine a delay where the prior decompressor queue size is continuously greater than or equal to the decompressor data size for the plurality of time intervals.

In various embodiments, a non-transitory computer-readable storage medium comprising instructions stored the non-transitory computer-readable storage medium, the instructions, when executed by one or more processors, cause the one or more processors to receive an acquisition including compressed data and dummy data from a downhole logging system. The instructions can further cause the one or more processors to determine a prior decompressor queue size based on the acquisition for a plurality of time intervals. The instructions can also cause the one or more processors to determine a decompressor data size based on the acquisition for the plurality of time intervals. Additionally, the instructions can also cause the one or more processors to determine a delay where the prior decompressor queue size is continuously greater than or equal to the decompressor data size for the plurality of time intervals.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Referring to FIG. 1, an example fracturing system 10 is shown. The example fracturing system 10 shown in FIG. 1 can be implemented using the systems, methods, and techniques described herein. In particular, the disclosed system, methods, and techniques may directly or indirectly affect one or more components or pieces of equipment associated with the example fracturing system 10, according to one or more embodiments. The fracturing system 10 includes a fracturing fluid producing apparatus 20, a fluid source 30, a solid source 40, and a pump and blender system 50. All or an applicable combination of these components of the fracturing system 10 can reside at the surface at a well site/fracturing pad where a well 60 is located.

During a fracturing job, the fracturing fluid producing apparatus 20 can access the fluid source 30 for introducing/controlling flow of a fluid, e.g. a fracturing fluid, in the fracturing system 10. While only a single fluid source 30 is shown, the fluid source 30 can include a plurality of separate fluid sources. Further, the fracturing fluid producing apparatus 20 can be omitted from the fracturing system 10. In turn, the fracturing fluid can be sourced directly from the fluid source 30 during a fracturing job instead of through the intermediary fracturing fluid producing apparatus 20.

The fracturing fluid can be an applicable fluid for forming fractures during a fracture stimulation treatment of the well 60. For example, the fracturing fluid can include water, a hydrocarbon fluid, a polymer gel, foam, air, wet gases, and/or other applicable fluids. In various embodiments, the fracturing fluid can include a concentrate to which additional fluid is added prior to use in a fracture stimulation of the well 60. In certain embodiments, the fracturing fluid can include a gel pre-cursor with fluid, e.g. liquid or substantially liquid, from fluid source 30. Accordingly, the gel pre-cursor with fluid can be mixed by the fracturing fluid producing apparatus 20 to produce a hydrated fracturing fluid for forming fractures.

The solid source 40 can include a volume of one or more solids for mixture with a fluid, e.g. the fracturing fluid, to form a solid-laden fluid. The solid-laden fluid can be pumped into the well 60 as part of a solids-laden fluid stream that is used to form and stabilize fractures in the well 60 during a fracturing job. The one or more solids within the solid source 40 can include applicable solids that can be added to the fracturing fluid of the fluid source 30. Specifically, the solid source 40 can contain one or more proppants for stabilizing fractures after they are formed during a fracturing job, e.g. after the fracturing fluid flows out of the formed fractures. For example, the solid source 40 can contain sand.

The fracturing system 10 can also include additive source 70. The additive source 70 can contain/provide one or more applicable additives that can be mixed into fluid, e.g. the fracturing fluid, during a fracturing job. For example, the additive source 70 can include solid-suspension-assistance agents, gelling agents, weighting agents, and/or other optional additives to alter the properties of the fracturing fluid. The additives can be included in the fracturing fluid to reduce pumping friction, to reduce or eliminate the fluid's reaction to the geological formation in which the well is formed, to operate as surfactants, and/or to serve other applicable functions during a fracturing job. The additives can function to maintain solid particle suspension in a mixture of solid particles and fracturing fluid as the mixture is pumped down the well 60 to one or more perforations.

The pump and blender system 50 functions to pump fracture fluid into the well 60. Specifically, the pump and blender system 50 can pump fracture fluid from the fluid source 30, e.g. fracture fluid that is received through the fracturing fluid producing apparatus 20, into the well 60 for forming and potentially stabilizing fractures as part of a fracture job. The pump and blender system 50 can include one or more pumps. Specifically, the pump and blender system 50 can include a plurality of pumps that operate together, e.g. concurrently, to form fractures in a subterranean formation as part of a fracturing job. The one or more pumps included in the pump and blender system 50 can be an applicable type of fluid pump. For example, the pumps in the pump and blender system 50 can include electric pumps and/or hydrocarbon and hydrocarbon mixture powered pumps. Specifically, the pumps in the pump and blender system 50 can include diesel powered pumps, natural gas powered pumps, and diesel combined with natural gas powered pumps.

The pump and blender system 50 can also function to receive the fracturing fluid and combine it with other components and solids. Specifically, the pump and blender system 50 can combine the fracturing fluid with volumes of solid particles, e.g. proppant, from the solid source 40 and/or additional fluid and solids from the additive source 70. In turn, the pump and blender system 50 can pump the resulting mixture down the well 60 at a sufficient pumping rate to create or enhance one or more fractures in a subterranean zone, for example, to stimulate production of fluids from the zone. While the pump and blender system 50 is described to perform both pumping and mixing of fluids and/or solid particles, in various embodiments, the pump and blender system 50 can function to just pump a fluid stream, e.g. a fracture fluid stream, down the well 60 to create or enhance one or more fractures in a subterranean zone.

The fracturing fluid producing apparatus 20, fluid source 30, and/or solid source 40 may be equipped with one or more monitoring devices (not shown). The monitoring devices can be used to control the flow of fluids, solids, and/or other compositions to the pumping and blender system 50. Such monitoring devices can effectively allow the pumping and blender system 50 to source from one, some or all of the different sources at a given time. In turn, the pumping and blender system 50 can provide just fracturing fluid into the well at some times, just solids or solid slurries at other times, and combinations of those components at yet other times.

Figure 2:
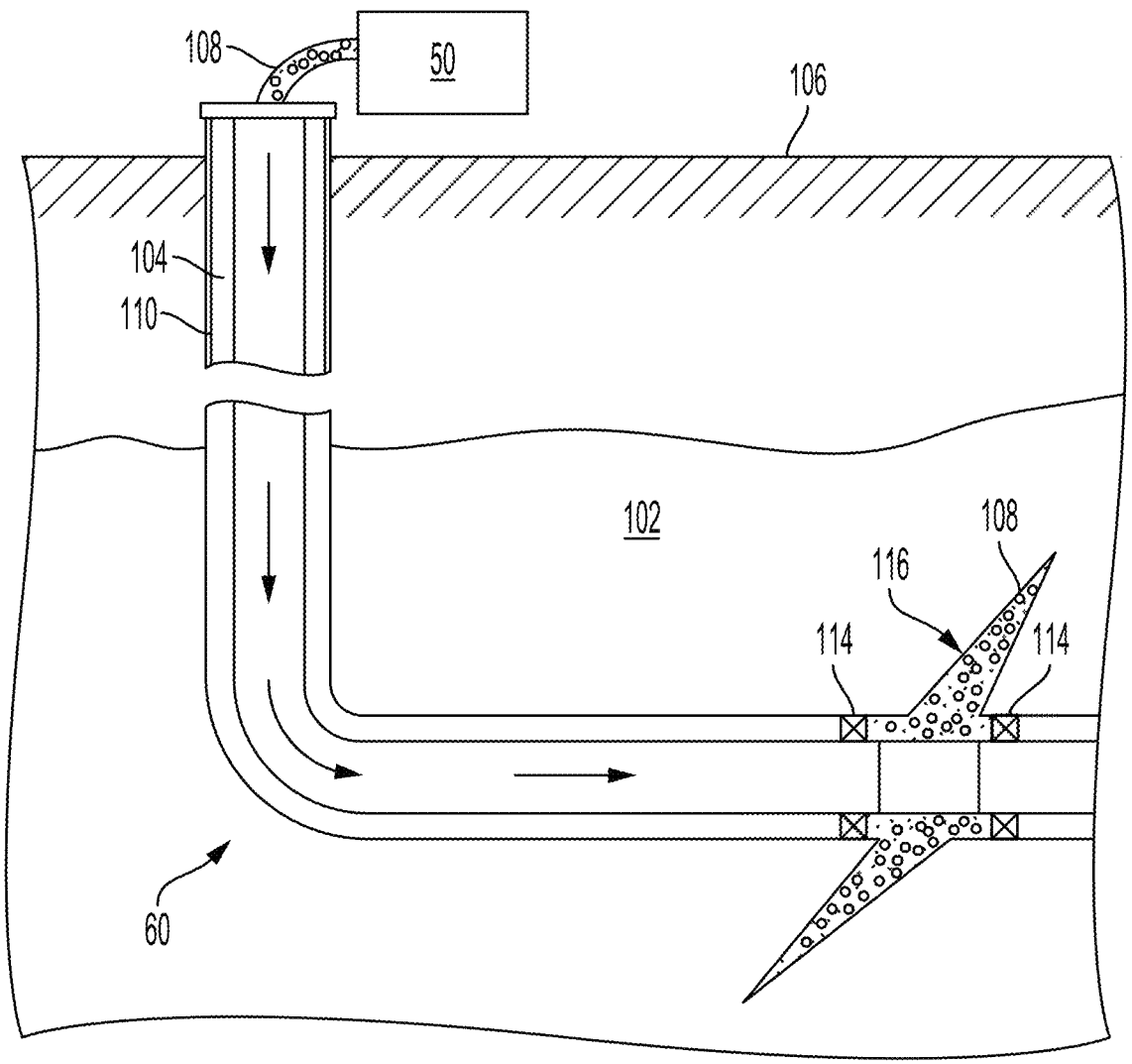
FIG. 2 illustrates a well during a fracturing operation in a portion of a subterranean formation of interest surrounding a wellbore, in accordance with aspects of the present disclosure.

FIG. 2 shows the well 60 during a fracturing operation in a portion of a subterranean formation of interest 102 surrounding a wellbore 104. The fracturing operation can be performed using one or an applicable combination of the components in the example fracturing system 10 shown in FIG. 1. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore 104. The wellbore 104 can include a casing 110 that is cemented or otherwise secured to the wellbore wall. The wellbore 104 can be uncased or otherwise include uncased sections. Perforations can be formed in the casing 110 to allow fracturing fluids and/or other materials to flow into the subterranean formation 102. As will be discussed in greater detail below, perforations can be formed in the casing 110 using an applicable wireline-free actuation or a wireline that deploys perforation guns. In the example fracture operation shown in FIG. 2, a perforation is created between points 114.

The pump and blender system 50 is fluidly coupled to the wellbore 104 to pump the fracturing fluid 108, and potentially other applicable solids and solutions into the wellbore 104. When the fracturing fluid 108 is introduced into wellbore 104 it can flow through at least a portion of the wellbore 104 to the perforation, defined by points 114. The fracturing fluid 108 can be pumped at a sufficient pumping rate through at least a portion of the wellbore 104 to create one or more fractures 116 through the perforation and into the subterranean formation 102. Specifically, the fracturing fluid 108 can be pumped at a sufficient pumping rate to create a sufficient hydraulic pressure at the perforation to form the one or more fractures 116. Further, solid particles, e.g. proppant from the solid source 40, can be pumped into the wellbore 104, e.g. within the fracturing fluid 108 towards the perforation. In turn, the solid particles can enter the fractures 116 where they can remain after the fracturing fluid flows out of the wellbore. These solid particles can stabilize or otherwise "prop" the fractures 116 such that fluids can flow freely through the fractures 116.

While only two perforations at opposing sides of the wellbore 104 are shown in FIG. 2, as will be discussed in greater detail below, greater than two perforations can be formed in the wellbore 104, e.g. along the top side of the wellbore 104, as part of a perforation cluster. Fractures can then be formed through the plurality of perforations in the perforation cluster as part of a fracturing stage for the perforation cluster. Specifically, fracturing fluid and solid particles can be pumped into the wellbore 104 and pass through the plurality of perforations during the fracturing stage to form and stabilize the fractures through the plurality of perforations.

Figure 3:
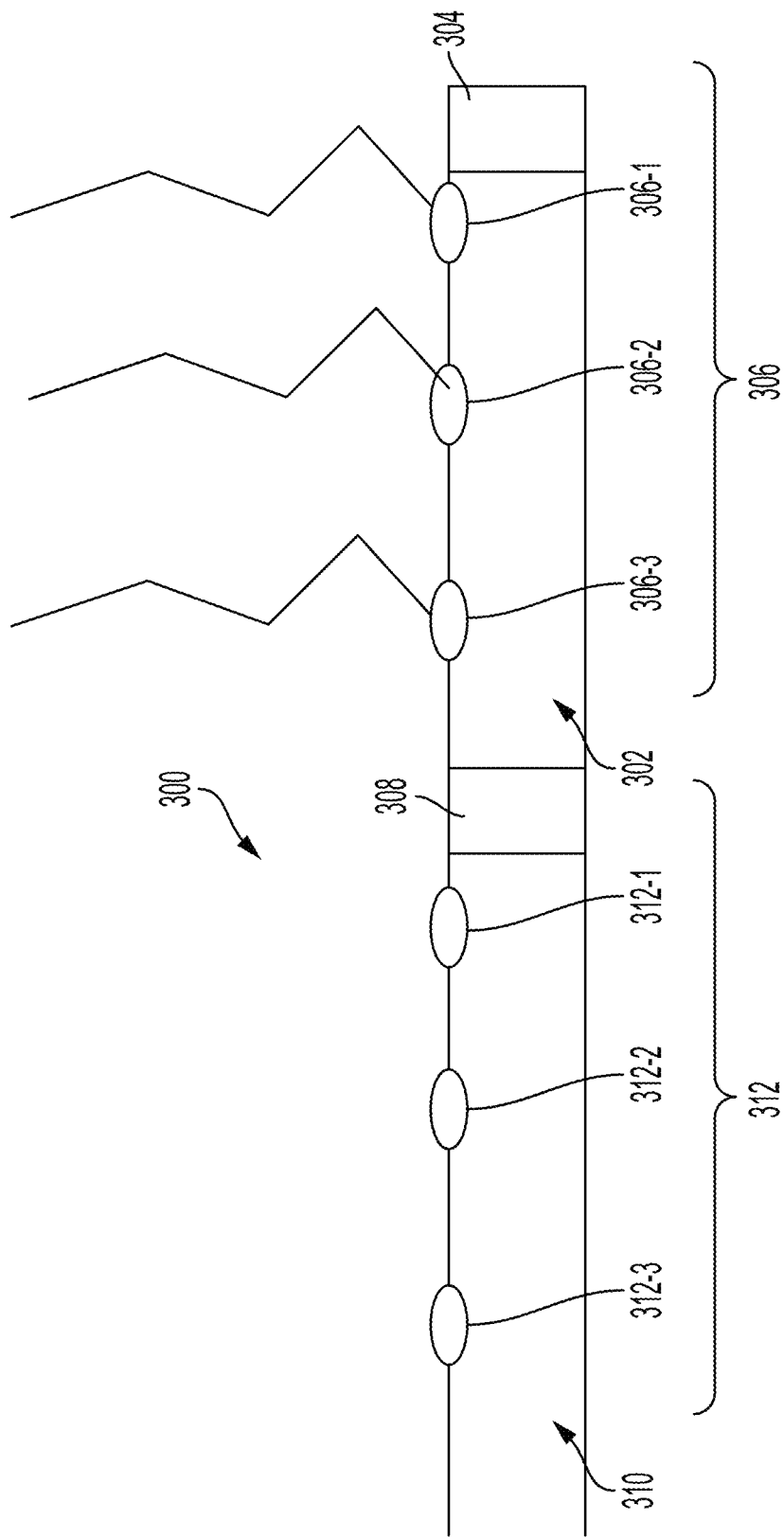
FIG. 3 illustrates a portion of a wellbore that is fractured using multiple fracture stages, in accordance with aspects of the present disclosure.

FIG. 3 shows a portion of a wellbore 300 that is fractured using multiple fracture stages. Specifically, the wellbore 300 is fractured in multiple fracture stages using a plug-and-perf technique.

The example wellbore 300 includes a first region 302 within a portion of the wellbore 300. The first region 302 can be positioned in proximity to a terminal end of the wellbore 300. The first region 302 is formed within the wellbore 300, at least in part, by a plug 304. Specifically, the plug 304 can function to isolate the first region 302 of the wellbore 300 from another region of the wellbore 300, e.g. by preventing the flow of fluid from the first region 302 to another region of the wellbore 300. The region isolated from the first region 302 by the plug 304 can be the terminal region of the wellbore 300. Alternatively, the region isolated from the first region 302 by the plug 304 can be a region of the wellbore 300 that is closer to the terminal end of the wellbore 300 than the first region 302. While the first region 302 is shown in FIG. 3 to be formed, at least in part, by the plug 304, in various embodiments, the first region 302 can be formed, at least in part, by a terminal end of the wellbore 300 instead of the plug 304. Specifically, the first region 302 can be a terminal region within the wellbore 300.

The first region 302 includes a first perforation 306-1, a second perforation 306-2, and a third perforation 306-3. The first perforation 306-1, the second perforation 306-2, and the third perforation 306-3 can form a perforation cluster 306 within the first region 302 of the wellbore 300. While three perforations are shown in the perforation cluster 306, in various embodiments, the perforation cluster 306 can include fewer or more perforations. As will be discussed in greater detail later, fractures can be formed and stabilized within a subterranean formation through the perforations 306-1, 306-2, and 306-3 of the perforation cluster 306 within the first region 302 of the wellbore 300. Specifically, fractures can be formed and stabilized through the perforation cluster 306 within the first region 302 by pumping fracturing fluid and solid particles into the first region 302 and through the perforations 306-1, 306-2, and 306-3 into the subterranean formation.

The example wellbore 300 also includes a second region 310 positioned closer to the wellhead than the first region 302. Conversely, the first region 302 is in closer proximity to a terminal end of the wellbore 300 than the second region 310. For example, the first region 302 can be a terminal region of the wellbore 300 and therefore be positioned closer to the terminal end of the wellbore 300 than the second region 310. The second region 310 is isolated from the first region 302 by a plug 308 that is positioned between the first region 302 and the second region 310. The plug 308 can fluidly isolate the second region 310 from the first region 302. As the plug 308 is positioned between the first and second regions 302 and 310, when fluid and solid particles are pumped into the second region 310, e.g. during a fracture stage, the plug 308 can prevent the fluid and solid particles from passing from the second region 310 into the first region 302.

The second region 310 includes a first perforation 312-1, a second perforation 312-2, and a third perforation 312-3. The first perforation 312-1, the second perforation 312-2, and the third perforation 312-3 can form a perforation cluster 312 within the second region 310 of the wellbore 300. While three perforations are shown in the perforation cluster 312, in various embodiments, the perforation cluster 312 can include fewer or more perforations. As will be discussed in greater detail later, fractures can be formed and stabilized within a subterranean formation through the perforations 312-1, 312-2, and 312-3 of the perforation cluster 312 within the second region 310 of the wellbore 300. Specifically, fractures can be formed and stabilized through the perforation cluster 312 within the second region 310 by pumping fracturing fluid and solid particles into the second region 310 and through the perforations 312-1, 312-2, and 312-3 into the subterranean formation.

In fracturing the wellbore 300 in multiple fracturing stages through a plug-and-perf technique, the perforation cluster 306 can be formed in the first region 302 before the second region 310 is formed using the plug 308. Specifically, the perforations 306-1, 306-2, and 306-3 can be formed before the perforations 312-1, 312-2, and 312-3 are formed in the second region 310. The perforations 306-1, 306-2, and 306-3 can be formed using a wireline-free actuation. Once the perforations 306-1, 306-2, and 306-3 are formed, fracturing fluid and solid particles can be transferred through the wellbore 300 into the perforations 306-1, 306-2, and 306-3 to form and stabilize fractures in the subterranean formation as part of a first fracturing stage. The fracturing fluid and solid particles can be transferred from a wellhead of the wellbore 300 to the first region 302 through the second region 310 of the wellbore 300. Specifically, the fracturing fluid and solid particles can be transferred through the second region 310 before the second region 310 is formed, e.g. using the plug 308, and the perforation cluster 312 is formed. This can ensure, at least in part, that the fracturing fluid and solid particles flow through the second region 310 and into the subterranean formation through the perforations 306-1, 306-2, and 306-3 within the perforation cluster 306 in the first region 302.

After the fractures are formed through the perforations 306-1, 306-2, and 306-3, the wellbore 300 can be filled with the plug 308. Specifically, the wellbore 300 can be plugged with the plug 308 to form the second region 310. Then, the perforations 312-1, 312-2, and 312-3 can be formed, e.g. using a wireline-free actuation. Once the perforations 312-1, 312-2, and 312-3 are formed, fracturing fluid and solid particles can be transferred through the wellbore 300 into the perforations 312-1, 312-2, and 312-3 to form and stabilize fractures in the subterranean formation as part of a second fracturing stage. The fracturing fluid and solid particles can be transferred from the wellhead of the wellbore 300 to the second region 310 while the plug 308 prevents transfer of the fluid and solid particles to the first region 302. This can effectively isolate the first region 302 until the first region 302 is accessed for production of resources, e.g. hydrocarbons. After the fractures are formed through the perforation cluster 312 in the second region 310, a plug can be positioned between the second region 310 and the wellhead, e.g. to fluidly isolate the second region 310. This process of forming perforations and forming fractures during a fracture stage, followed by plugging on a region by region basis can be repeated. Specifically, this process can be repeated up the wellbore towards the wellhead until a completion plan for the wellbore 300 is finished.

Figure 4:
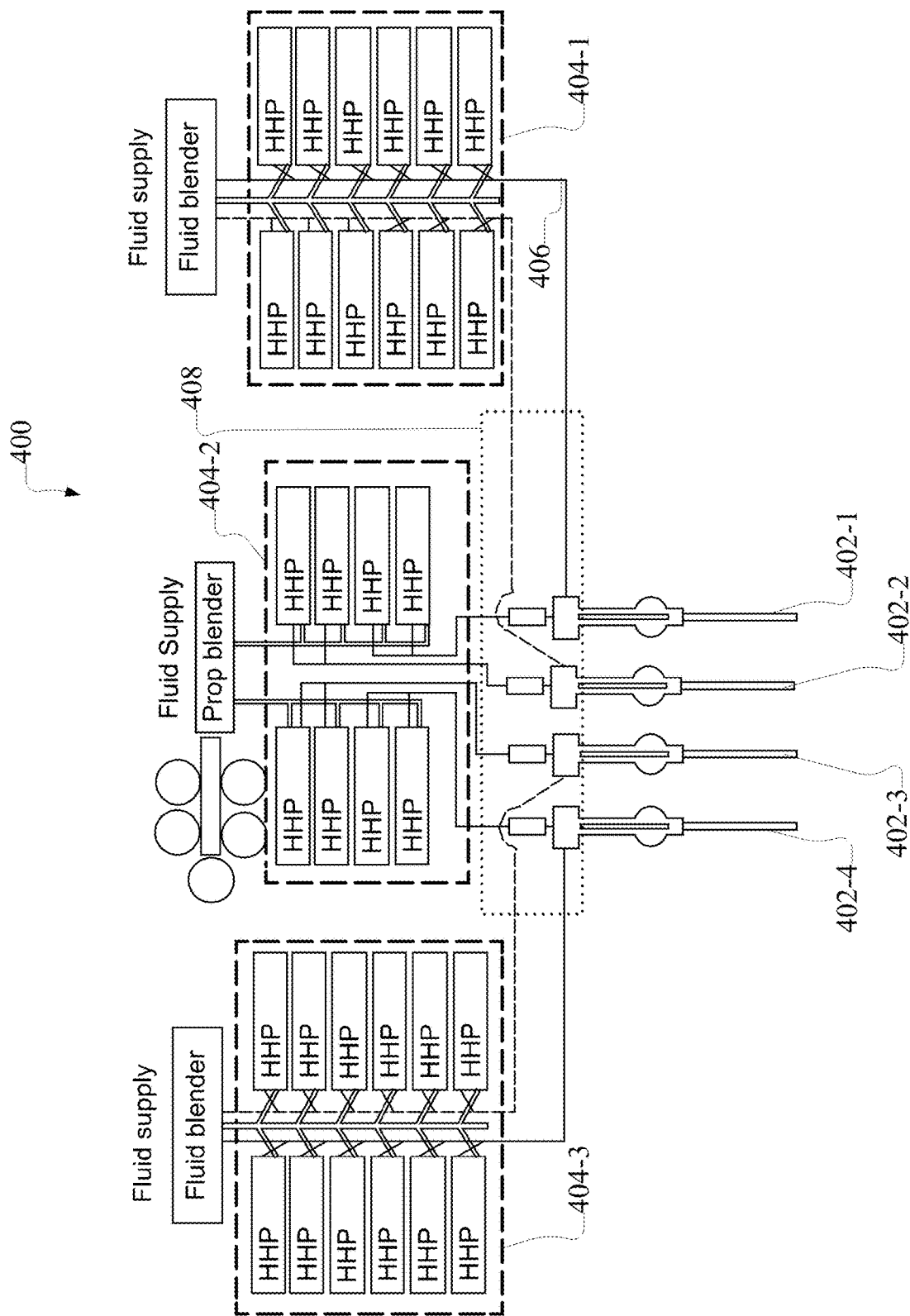
FIG. 4 illustrates an example fracturing system for concurrently performing fracturing stages in multiple wellbores, in accordance with aspects of the present disclosure.

FIG. 4 shows an example fracturing system 400 for concurrently performing fracturing stages in multiple wellbores. The example fracturing system 400 can be implemented using one or an applicable combination of the components shown in the example fracturing system 10 shown in FIG. 1. Further, the example fracturing system 400 can form fractures according to the example techniques implemented in the well 60 shown in FIG. 2 and the wellbore 300 shown in FIG. 3.

The example fracturing system 400 includes a first wellbore 402-1, a second wellbore 402-2, a third wellbore 402-3, and a fourth wellbore 402-4, collectively referred to as the wellbores 402. While four wellbores 402 are shown, the fracturing system 400 can include three or two wellbores, as long as the fracturing system 400 includes more than one wellbore. Further, the fracturing system 400 can include more than four wellbores.

The example fracturing system 400 also includes a first pump 404-1, a second pump 404-2, and a third pump 404-3, collectively referred to as a pumping system 404. While the pumping system is shown as including three separate pumps, the pumping system 404 can include fewer than three pumps or more than three pumps. For example, the pumping system 404 can include only a single pump. In some implementations, the first pump 404-1 can include a set of pumps where each block (HHP) can be one pump. Fluid coupling 406 (e.g., indicated by the solid line 406) can couple the six pumps (BHP) on the right side that feed fluid to the first wellbore 402-1. The second pump 404-2 can add proppant to the mix and be supported by the two lower right HHP blocks/pumps to the first well 402-1. In some examples, the fracturing system 400 can include eight sets of pumps that are correspondingly coupled to the four wellbores 402-1, 402-2, 402-3, 402-4. The pumping system 404 can also include three sets of pumps, where the first pump 404-1 includes two sets of pumps and the third pump 404-3 includes two sets of pumps that share a common fluid blender. The second pump 404-2 can include four sets of pumps that share a common proppant blender. In another example, eight sets of pumps can support four sets of wells, where each well is supported by one fluid pump set and one proppant pump set.

The pumping system 404 is fluidly connected to each of the wellbores 402. Specifically, the pumping system 404 can be fluidly connected to each of the wellbores 402, at least in part, through one or more fluid couplings, e.g. fluid coupling 406. In being fluidly connected to each of the wellbores 402, the pumping system 404 can pump fracturing fluid and solid particles, e.g. proppant, into the wellbores 402 for forming and stabilizing fractures through the wellbores 402. Specifically, the pumping system 404 can pump fracturing fluid and solid particles into the wellbores 402 for forming and stabilizing fractures through passages and/or perforations in the wellbores 402. The pumping system 404 can pump fracturing fluid into the wellbores 402 for forming fractures in the wellbores 402 according to the previously described plug-and-perf technique. Further, the pumping system 404 can pump solid particles, e.g. proppant, in a solid-laden fluid stream into the wellbores 402 for stabilizing the fractures according to the previously described plug-and-perf technique. In being fluidly connected to each of the wellbores 402, the pumping system 404 can pump additional components, e.g. additives, into the wellbores 402 for aiding in the formation and/or stabilization of fractures in the wellbores 402.

Figure 5:
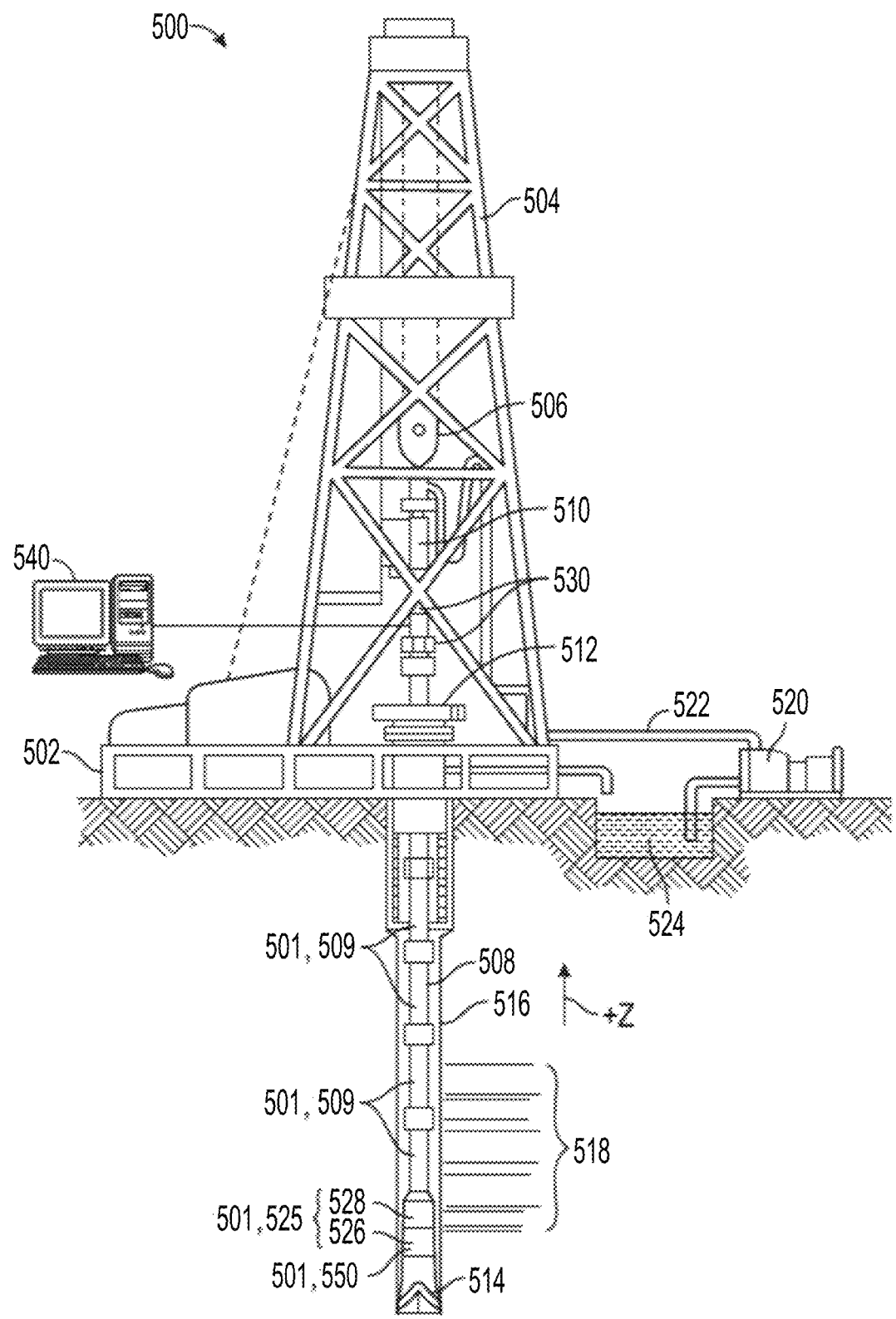
FIG. 5 illustrates an example diagram of an environment in which a drilling system may be used, in accordance with aspects of the present disclosure.

FIG. 5 illustrates a diagrammatic view of an example wellbore drilling environment 500, for example, a logging while drilling (LWD) and/or measurement while drilling (MWD) wellbore environment, in which the present disclosure may be implemented. As illustrated in FIG. 5, a drilling platform 502 is equipped with a derrick 504 that supports a hoist 506 for raising and lowering one or more drilling components 501 which can include, for example, a drill string 508 which can include one or more drill collars 509, a drill bit 514, and/or a bottom-hole assembly 525. The drilling components 501 are operable to drill a wellbore 516. The drilling components 501 also can include housings for one or more downhole tools. The drilling components 501 include at least one material having an actual yield strength. The actual yield strength can be determined and/or provided by the manufacturer of the drilling components 501. For example, the material of the drilling components 501 can be non-magnetic. In some examples, the material of the drilling components 501 can be stainless steel.

The hoist 506 suspends a top drive 510 suitable for rotating the drill string 508 and lowering the drill string 508 through the well head 512. Connected to the lower end of the drill string 508 is a drill bit 514. As the drill bit 514 rotates, the drill bit 514 creates a wellbore 516 that passes through various formations 518. A pump 520 circulates drilling fluid through a supply pipe 522 to top drive 510, down through the interior of drill string 508, through orifices in drill bit 514, back to the surface via the annulus around drill string 508, and into a retention pit 524. The drilling fluid transports cuttings from the wellbore 516 into the pit 524 and aids in maintaining the integrity of the wellbore 516. Various materials can be used for drilling fluid, including oil-based fluids and water-based fluids.

Referring to FIG. 5, sensors 526 can be provided, for example integrated into the bottom-hole assembly 525 near the drill bit 514. As the drill bit 514 extends the wellbore 516 through the formations 518, the sensors 526 can collect measurements of various drilling parameters, for example relating to various formation properties, the orientation of the drilling component(s) 501, dog leg severity, pressure, temperature, weight on bit, torque on bit, and/or rotations per minute. The sensors 526 can be any suitable sensor to measure the drilling parameters, for example transducers, fiber optic sensors, and/or surface and/or downhole sensors. The bottom-hole assembly 525 may also include a telemetry sub 528 to transfer measurement data to a surface receiver 530 and to receive commands from the surface. In some examples, the telemetry sub 528 communicates with a surface receiver 530 using mud pulse telemetry. In other examples, the telemetry sub 528 does not communicate with the surface, but rather stores logging data for later retrieval at the surface when the logging assembly is recovered. Notably, one or more of the bottom-hole assembly 525, the sensors 526, and the telemetry sub 528 may also operate using a non-conductive cable (e.g. slickline, etc.) with a local power supply, such as batteries and the like. When employing non-conductive cable, communication may be supported using, for example, wireless protocols (e.g. EM, acoustic, etc.) and/or measurements and logging data may be stored in local memory for subsequent retrieval at the surface.

Each of the sensors 526 may include a plurality of tool components, spaced apart from each other, and communicatively coupled with one or more wires. The telemetry sub 528 may include wireless telemetry or logging capabilities, or both, such as to transmit information in real time indicative of actual downhole drilling parameters to operators on the surface.

The sensors 526, for example an acoustic logging tool, may also include one or more computing devices 550 communicatively coupled with one or more of the plurality of drilling components 501. The computing device 550 may be configured to control or monitor the performance of the sensors 526, process logging data, and/or carry out the methods of the present disclosure.

In some examples, one or more of the sensors 526 may communicate with a surface receiver 530, such as a wired drillpipe. In other cases, the one or more of the sensors 526 may communicate with a surface receiver 530 by wireless signal transmission. In at least some cases, one or more of the sensors 526 may receive electrical power from a wire that extends to the surface, including wires extending through a wired drillpipe. In at least some examples the methods and techniques of the present disclosure may be performed by a controller 540, for example a computing device, on the surface. The controller 540 is discussed in further detail below. In some examples, the controller 540 may be included in and/or communicatively coupled with surface receiver 530. For example, surface receiver 530 of wellbore operating environment 500 at the surface may include one or more of wireless telemetry, processor circuitry, or memory facilities, such as to support substantially real-time processing of data received from one or more of the sensors 526. In some examples, data can be processed at some time subsequent to its collection, wherein the data may be stored on the surface at surface receiver 530, stored downhole in telemetry sub 528, or both, until it is retrieved for processing.

Permanently installed sensors may include fiber optic cables cemented in place in the annular space between the casing and the formation. The fiber optic cables may be clamped to the outside of the casing during deployment and protected by centralizers and cross coupling clamps during Run-In-Hole (RIH). Some examples include utilizing tubing conveyed cables, retrievable sensing cables such as wireline and slickline, or cables that are deployed inside a coiled tubing. Fiber optic cables can also be deployed in wells using gravity where a weight or conveyance vehicle can be dropped into a wellbore, where the fiber is then released into the well as the deployment vehicle moves down the wellbore. The optical fiber may be paid out from the surface or from a coil in the deployment vehicle. Gravity-based deployment vehicles may also be utilized when pumping into horizontal well bores.

Other types of fiber optic sensors may include point sensors either at the surface or downhole. Single point or multi-point pressure and temperature sensors may be used in reservoir monitoring applications, where the pressure sensors may be capable of collecting data at rates up to 2,000 Hz or even higher.

The fiber optic cables may also house one or several optical fibers. The optical fibers can also include single mode fibers, multi-mode fibers, or a combination of single mode and multi-mode optical fibers. The fiber optic sensing systems connected to the optical fibers can include Distributed Temperature Sensing (DTS) systems, Distributed Acoustic Sensing (DAS) Systems, Distributed Strain Sensing (DSS) Systems, quasi-distributed sensing systems where multiple single point sensors are distributed along an optical fiber/cable, or single point sensing systems where the sensors are located at the end of the cable.

The fiber optic sensing systems can operate using various sensing principles such as Rayleigh scattering, Brillouin scattering, Raman scattering including but not limited to amplitude-based sensing systems such as DTS systems based on Raman scattering, phase sensing based systems such as DAS systems based on interferometric sensing using homodyne or heterodyne techniques where the system may sense phase or intensity changes due to constructive or destructive interference, strain sensing systems such as DSS using dynamic strain measurements based on interferometric sensors or static strain sensing measurements using, for example, Brillouin scattering, quasi-distributed sensors based on Fiber Bragg Gratings (FBGs) where a wavelength shift can be detected or multiple FBGs are used to form Fabry-Perot type interferometric sensors for phase or intensity based sensing, or single point fiber optic sensors based on Fabry-Perot, FBG, or intensity-based sensors.

True Distributed Fiber Optic Sensing (DFOS) systems can also be utilized and based on Optical Time Domain Reflectometry (OTDR) principles or Optical Frequency Domain Reflectometry (OFDR). OTDR-based systems are pulsed where one or more optical pulses can be transmitted down an optical fiber and backscattered light (e.g., Rayleigh, Brillouin, Raman, etc.) is measured and processed. Time of flight for the optical pulses can indicate where along the optical fiber the measurement is performed. OFDR-based systems can operate in continuous wave (CW) mode where a tunable laser is swept across a wavelength range, and the back scattered light is collected and processed.

Various hybrid approaches can also include single point, quasi-distributed, or a combination of distributed fiber optic sensors such as electrical sensors. The fiber optic cable can also include optical fibers and electrical conductors. Electrical sensors can include pressure sensors based on quarts type sensors, strain gauge based sensors, or any other sensing technology suitable for the intended purpose and understood by a person of ordinary skill in the art. Pressure sensors, optical or electrical, can be housed in dedicated gauge mandrels, attached outside the casing in various configurations for down-hole deployment, or deployed at the surface well head or flow lines.

Temperature measurements received from a DTS system can be used to determine locations for water injection applications where fluid inflow in the treatment well, as well as the fluids from the surface, are likely to be cooler than formation temperatures. DTS warm-back analyses can determine fluid volume placement. This can be performed for water injection wells and fracturing fluid placement. Temperature measurements in observation wells can be used to determine fluid communication between the treatment well and the observation well, or to determine formation fluid movement.

DAS data can be used to determine fluid allocation in real-time as acoustic noise is generated when fluid flows through the casing and in through perforations into the formation. Phase and intensity based interferometric sensing systems are sensitive to temperature and mechanical, as well as acoustically induced vibrations. DAS data can be converted from time series data to frequency domain data using Fast Fourier Transforms (FFT) and other transforms (e.g., wavelet transforms can be utilized to generate different representations of the data). Various frequency ranges can be used for different purposes. Low frequency signal changes can be attributed to formation strain changes. Temperature changes can be due to fluid movement. Other frequency ranges can also be indicative of fluid or gas movement. Various filtering techniques and models can be applied to generate indicators of events that may be of interest. Indicators can include formation movement due to growing natural fractures, formation stress changes during the fracturing operations (e.g., stress shadowing), fluid seepage during the fracturing operation as formation movement can force fluid into an observation well that can be detected, fluid flow from fractures, and fluid and proppant flow from fracture hits. Each indicator can have a characteristic signature in terms of frequency content, amplitude, and/or time dependent behavior. These indicators can also be present at other data types and not limited to DAS data. Fiber optic cables used with DAS systems can include enhanced back scatter optical fibers where the Rayleigh backscatter can be increased by 10× or more with associated increases in Optical Signal to Noise Ratio (OSNR).

DAS systems can also be used to detect various seismic events where stress fields and growing fracture networks generate microseismic events or where perforation charge events may be used to determine travel time between horizontal wells. The detected data can also be used stage-to-stage to determine changes in travel time as the formation is fractured and filled with fluid and proppant. The DAS systems can also be used with surface seismic sources to generate Vertical Seismic Profiles (VSPs) before, during, and after a fracturing job to determine the effectiveness of the fracturing job as well as to determine production effectiveness. VSPs and reflection seismic surveys can be used over the life of a well or reservoir to track production related depletion and water, gas, and polymer flood fronts.

DSS data can be generated using various approaches. For example, static strain data can be used to determine absolute strain changes over time. Static strain data can be measured using Brillouin-based systems or quasi-distributed strain data from an FBG-based system. Static strain can also be used to determine propped fracture volume by looking at deviations in strain data from a measured strain baseline before fracturing a stage. Formation properties such as permeability, poroelastic responses, and leak off rates can be determined based on the change of strain versus time and the rate at which the strain changes over time. Dynamic strain data can be used in real-time to detect fracture growth through a corresponding inversion model and appropriate actions such as dynamic changes to fluid flow rates in the treatment well. Additional diverters or chemicals into the fracturing fluid, or changes to proppant concentrations or types can then be used to mitigate detrimental effects.

Fiber Bragg Grating based systems can also be used for a number of different measurements. FBGs can include partial reflectors that can be used as temperature and strain sensors, or can be used to make various interferometric sensors with very high sensitivity. FBGs can also be used to make point sensors or quasi-distributed sensors where FBG-based sensors can be used independently or with other types of fiber optic based sensors. FBGs can be manufactured into an optical fiber at a specific wavelength and other system such as DAS, DSS, or DTS systems, which may operate at different wavelengths in the same fiber and measure different parameters simultaneously as FBG-based systems use Wavelength Division Multiplexing (WDM) and/or Time Division Multiplexing (TDM).

In some implementations, the sensors can be positioned in either the injection wells or the production wells to measure reservoir level data of interest. For hydraulic fracturing wells, this can include treatment well pressure, rate, proppant concentration, diverters, fluids, and chemicals that may be altered to change the hydraulic fracturing treatment. These changes may impact the formation responses in several different ways such as changing stress fields. This may generate microseismic effects that can be measured with the DAS systems and the single point seismic sensors such as geophones. Fracture growth rates can change and this can generate changes in measured microseismic events and event distributions over time, or changes in measured strain using the low frequency portion, the DAS signal, or Brillouin-based sensing systems. Pressure changes can also be due to poroelastic effects that can be measured in the monitoring well. Pressure data can be measured in the treatment well and correlated to formation responses. Various changes in treatment rates and pressure may generate events that can be correlated to fracture growth rates.

All of the technologies and measurements outlined herein can be used for reservoir measurements in injection and production wells.

Several measurements can also be combined to determine adjacent well communication, and these measurements can further be used to change a hydraulic fracturing treatment schedule to generate desired outcomes. Multiple wells in a field or reservoir may include optical fibers for monitoring subsurface reservoirs from cradle to grave. Subsurface applications can include hydrocarbon extraction, geothermal energy production, and fluid injection such as water or $CO_2$ in carbon capture, utilization, and storage (CCUS) applications.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

As provided above, telemetry schemes can include data compression and typically require a real-time logging system to reduce data size and save telemetry bandwidth. The compressed data size can vary from acquisition to acquisition, but the telemetry bandwidth is usually fixed. Traditionally, a telemetry bandwidth is utilized that can accommodate a maximum data size among all acquisitions, resulting in an inefficient use of bandwidth for many of the acquisitions.

As such, a need exists to mediate the conflict between variable data sizes and a fixed telemetry bandwidth in a real-time logging system.

The disclosed technology can include a telemetry scheme that can significantly reduce a required bandwidth by introducing an insensible group delay at a surface receiver.

Figure 6:
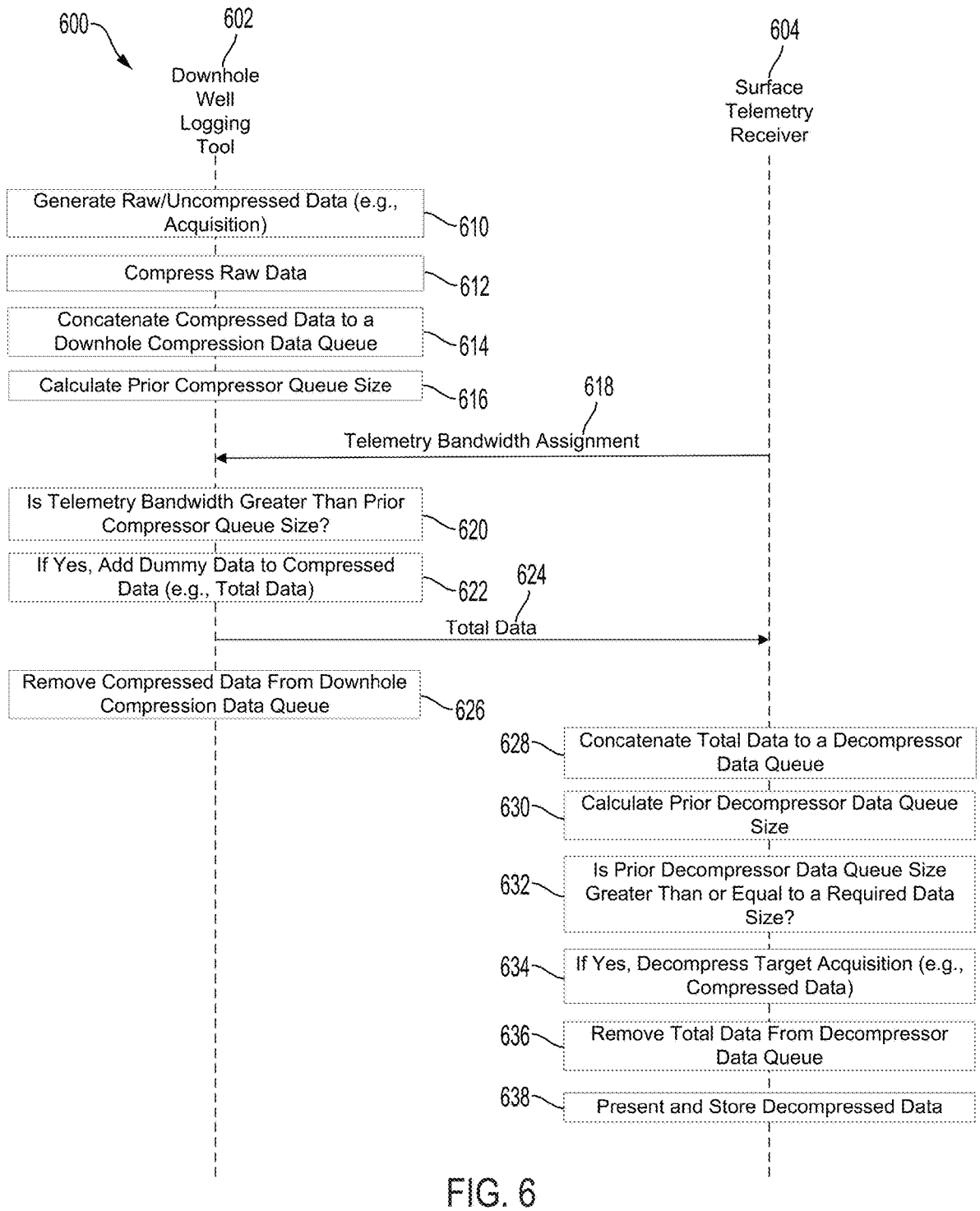
FIG. 6 illustrates an example process for optimizing a telemetry scheme with a constant insensible group delay, in accordance with aspects of the present disclosure.

FIG. 6 illustrates an example process for optimizing a telemetry scheme with a constant insensible group delay 600, in accordance with aspects of the present disclosure. The telemetry scheme process 600 can include utilizing a downhole well logging tool 602 and a surface telemetry receiver 604, as described herein. The telemetry scheme process 600 can also include utilizing a compressor data queue at the downhole well logging tool 602 and a decompressor data queue at the surface telemetry receiver 604 to temporarily store compressed data. The telemetry scheme process 600 can further include utilizing a constant telemetry rate that may be near the average compressed data size among various acquisitions (e.g., raw data measured by sensors), which can also be used to transmit data. The telemetry scheme process 600 can also include utilizing an insensible constant time delay between downhole measured data and surface received data, as further described in the present disclosure.

In some implementations, the telemetry scheme process 600 can be utilized for various telemetry platforms and not only for fracturing/drilling operations. The telemetry scheme process 600 can further reduce a required bandwidth significantly for a real-time logging tool (e.g., the downhole well logging tool 602 and the surface telemetry receiver 604). The telemetry scheme process 600 can also allow more tools to be used at the same time in a particular run and reduce non-productive time. This can allow more high-precision logging data to be measured and transmitted in real-time, which can improve the quality of related answer products. Answer products can include any final results that a well logging tool can provide to a customer. For example, answer products can include: an acoustic impedance image of a wellbore for cement and casing analysis from an ultrasonic cement evaluation tool; shear-wave velocity logs for geomechanical analysis from an acoustic formation evaluation tool; and time delay utilized by the telemetry scheme process 600, as described herein, can be constant and insensible.

In other implementations, real-time telemetry data can be useful for many well logging tools. For many well logging tools (e.g., the downhole well logging tool 602 and the surface telemetry receiver 604), data compression can reduce the size of the data being transmitted since the telemetry bandwidth may be limited. Data compression algorithms can be cataloged as lossy compression and lossless compression. Lossy compression methods can introduce errors to the compressed-and-decompressed data, while lossless compression methods do not introduce many errors. Many data compression methods, including lossless compression methods and lossy compression methods, do not utilize a fixed compression ratio, which can be defined as the size of compressed data divided by the size of uncompressed data. The fixed compression ratio can vary depending on the property of data, and the compressed size can vary from acquisition to acquisition (e.g., raw data measured by sensors).

In a real-time well logging system, the telemetry bandwidth can be fixed, including wireline telemetry and wireless telemetry in a cased-hole well or an open-hole well. In such an example, a conflict may arise between the fixed bandwidth and the variable data size of the acquisitions (e.g., raw data measured by sensors). Currently, a maximum possible data size for one second of data is used as the telemetry bandwidth, which is inefficient when the average data size per second of data is far less than the maximum possible data size. In particular, the bandwidth may not be effectively used when the data size is not the maximum possible data size, and the achieved compression ratio can be significantly lower than the initial compression ratio before telemetry.

The telemetry scheme process 600 can mediate a fixed telemetry bandwidth and a variable compressed size by utilizing a group delay by the surface telemetry receiver 604 and data decompression system at the surface. As used herein, the telemetry scheme process 600 utilizes bytes per second as a unit of telemetry bandwidth in the present disclosure. However, other units such as bits per second, bytes per minute, etc. can be utilized that are suitable for the intended purpose and understood by a person of ordinary skill in the art.

The telemetry scheme process 600 can include the following steps:

At step 610, the telemetry scheme process 600 can include, at time t (e.g., second), the downhole well logging tool 602 recording an acquisition such as producing raw/uncompressed data.

At step 612, the telemetry scheme process 600 can include data compression that may be performed by a downhole data compressor (e.g., an encoder) to compress the raw data. The size of the compressed data can be referred to as L(t) bytes.

At step 614, the telemetry scheme process 600 can include concatenating (e.g., linking together in a series or a chain) the compressed data (e.g., L(t) bytes) and generate a downhole compressor data queue. The downhole compressor data queue can be stored in memory or any other storage media.

At step 616, as the compressed data has yet to be transmitted via telemetry to the surface telemetry receiver 604, the telemetry scheme process 600 can include determining the size of the compressed data in the downhole compressor data queue as the prior compressor queue size, $Q_{compressor}^{Prior}(t)$. Referring to Equation 1, the prior compressor queue size ($Q_{compressor}^{Prior}(t)$) can be calculated as:

$$Q_{compressor}^{Prior}(t) = Q_{compressor}^{Post}(t-1) + L(t) \qquad \text{Eq. 1}$$

$Q_{compressor}^{Post}(t-1)$ can be the data size of the downhole compressor data queue after telemetry transmission at (t−1) second. L(t) bytes can be referred to as the size of the compressed data.

At step 618, the telemetry scheme process 600 can include the surface telemetry receiver 604 providing an assigned telemetry bandwidth to the downhole well logging tool 602 as T bytes/second, which may be a constant.

At steps 620, 622, if the assigned telemetry bandwidth is greater than the prior compressor queue size $Q_{compressor}^{Prior}(t)$, the telemetry scheme process 600 can include concatenating dummy data to the downhole compressor data queue to fill or complete the T bytes. For example, the dummy data can be added to the compressed data to generate a total data.

At step 624, the telemetry scheme process 600 can include the downhole compressor data queue of the downhole well logging tool 602 providing the T bytes of data (e.g., the total data) to the surface telemetry receiver 604 via telemetry. The size of the transmitted non-dummy data (e.g., the compressed data) can be calculated using Equation 2 as:

$$T_{non-dummy}(t) = \min[T, Q_{compressor}^{Prior}(t)] \qquad \text{Eq. 2}$$

At step 626, the telemetry scheme process 600 can include removing the data (e.g., the compressed data) that was provided to the surface telemetry receiver 604 from the downhole compressor data queue. The size of data in the downhole compressor data queue after telemetry (e.g., step 624) can be determined using Equation 3 as:

$$Q_{compressor}^{Post}(t) = \max[0, Q_{compressor}^{Prior}(t) - T] \qquad \text{Eq. 3}$$

$Q_{compressor}^{Prior}(t)$ can be referred to as the prior compressor queue size. T bytes can be referred to as the maximum data size that may be sent per second (e.g., the telemetry bandwidth assignment).

At step 628, the telemetry scheme process 600 can include concatenating the T bytes of telemetry data (e.g., the total data) received at the surface telemetry receiver 604 into a surface decompressor data queue.

At step 630, as data decompression of the T bytes of telemetry data has yet to occur, the size of the surface decompressor data queue, also referred to as a prior decompressor data queue size $Q_{decompressor}^{Prior}(t)$, can be calculated with Equation 4 as:

$$Q_{decompressor}^{Prior}(t) = Q_{decompressor}^{Post}(t-1) + T_{non-dummy}(t) \qquad \text{Eq. 4}$$

$Q_{decompressor}^{Post}(t-1)$ can be referred to as the data size of the surface decompressor data queue after data decompression at (t−1) second. $T_{non-dummy}(t)$ can be referred to as the size of the transmitted non-dummy data. In some implementations, the non-dummy data is considered by the surface telemetry receiver 604, while the dummy data may be skipped in the decompression process of the telemetry scheme process 600.

At steps 632, 634, the telemetry scheme process 600 can include a surface decompressor of the surface telemetry receiver 604 decompressing the acquisition (e.g., the compressed data) that was recorded and provided by the downhole well logging tool 602 at t−τ seconds, where τ can be referred to as a group time delay. For example, the data size of the acquisition at t−τ seconds can be L(t−τ). If the prior decompressor data queue size $Q_{decompressor}^{Prior}(t)$ is greater than or equal to the data size of the acquisition (L(t−τ)), the surface decompressor of the surface telemetry receiver 604 can successfully decompress the target acquisition. Otherwise, the decompression process may fail. In some implementations, the decompression process of the telemetry scheme process 600 can begin at the first byte of an acquisition and end after decompressing the last byte of the acquisition.

At step 636, after decompression of step 634 of the telemetry scheme process 600, the data of the acquisition can be removed from the surface decompressor data queue. The post decompressor data queue size can be calculated using Equation 5 below:

$$Q_{decompressor}^{Post}(t) = Q_{decompressor}^{Prior}(t) - L(t-\tau) \qquad \text{Eq. 5}$$

$Q_{decompressor}^{Prior}(t)$ can be referred to as the prior decompressor data queue size (e.g., the size of the surface decompressor data queue. L(t−τ) can be referred to as the data size of the acquisition at t−τ seconds. In some implementations, the group time delay "tau" (τ) can be a positive integer that satisfies the equation $Q_{decompressor}^{Prior}(t) \geq L(t-\tau)$ (as may be utilized in Eq. 5) at any given time t, from when t equals tau (τ) to when the last acquisition is logged in the well of the telemetry scheme process 600. Examples of determining the value of tau (τ) is provided in FIGS. 9 and 10 and their corresponding paragraphs in the present disclosure. For example, where L1=[200, 200, 200, 200, 200, 200, 200, 200, 200, 200, 200, 200, 400, 200, 200, 200, 200, 200, . . . ] and L2=[200, 300, 320, 200, 200, 200, 200, 200, 200, 200, 200, 200, 400, 200, 200, 200, 200, 200, . . . ], the 2nd and 3rd elements are different between L1 and L2. If L(t)=L1, T=200, and Tau=2, and utilizing the process described herein relating to FIG. 10, decompressing L1 does not fail. However, if L(t)=L2, T=200, and Tau=2, decompressing L2 may fail at the 15th second (e.g., 15th element). In some implementations, prior information and data can be utilized to determine whether the 15th second may fail, instead of only utilizing local information near the 15th second. Utilizing prior information may be similar to proceeding through the iterative process, as described herein, as the iterative process may contain plus and minus computations that are not computationally expensive.

In some implementations, the group time delay (τ) can be constant and not accumulative. This can provide a finite constant shift in time that can be applied to the decompressed data when compared to the original measured data at the downhole well logging tool 602. The type of delay utilized by the telemetry scheme process 600 can be referred to as a group delay, which may be insensible in a real-time system (e.g., which may be described as the downhole well logging tool 602 and the surface telemetry receiver 604 being unaware of a delay relating to the transmission of the acquisition).

At step 638, the telemetry scheme process 600 can include presenting and storing the decompressed data in a real-time logging system (e.g., the surface telemetry receiver 604).

Figure 7:
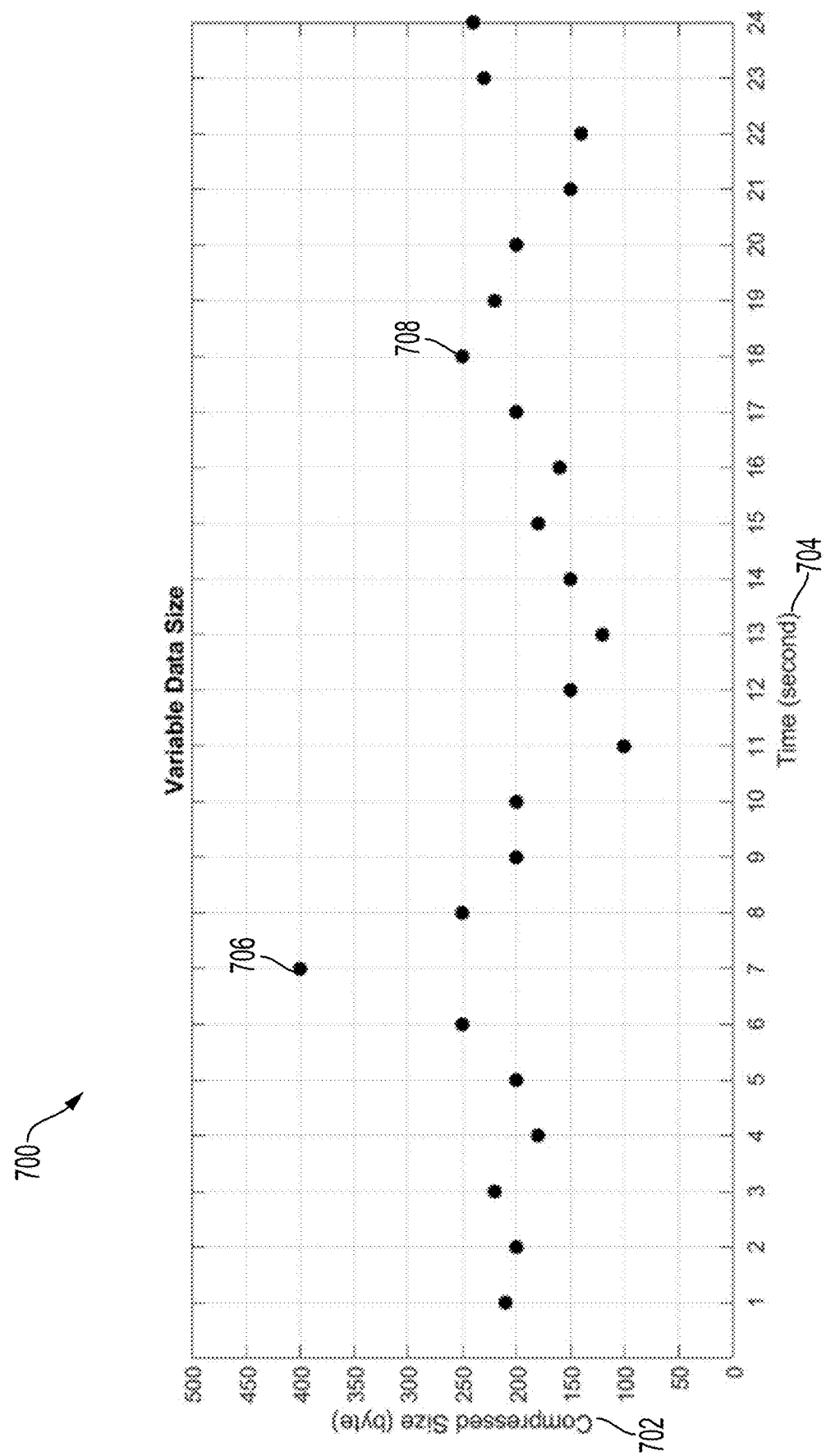
FIG. 7 illustrates an example graph of variable data sizes, in accordance with aspects of the present disclosure.

FIG. 7 illustrates an example graph of variable data sizes 700, in accordance with aspects of the present disclosure. The variable data size graph 700 includes comparing compressed size (in bytes) 702 of data packets 706, 708 with time (seconds) 704. For example, the uncompressed data size can be 1000 bytes for each second, while the average compressed data size for one second can be 200 bytes. In this example, the compression ratio (e.g., uncompressed data size divided by average compressed data size) is 1000/200=5.

Referring to FIG. 7, a traditional telemetry scheme may select a maximum individual data size (e.g., data point 706) as a telemetry bandwidth. In this example, the telemetry bandwidth may be set as 400 bytes/second for the data point 706, which would provide for an achieved compression ratio of 1000/400=2.5. In a real field job, a more conservative bandwidth is typically selected to accommodate for a possibly larger data size of a single second, thereby causing the compression ratio to become even worse (i.e., a lower compression ratio).

Figure 8:
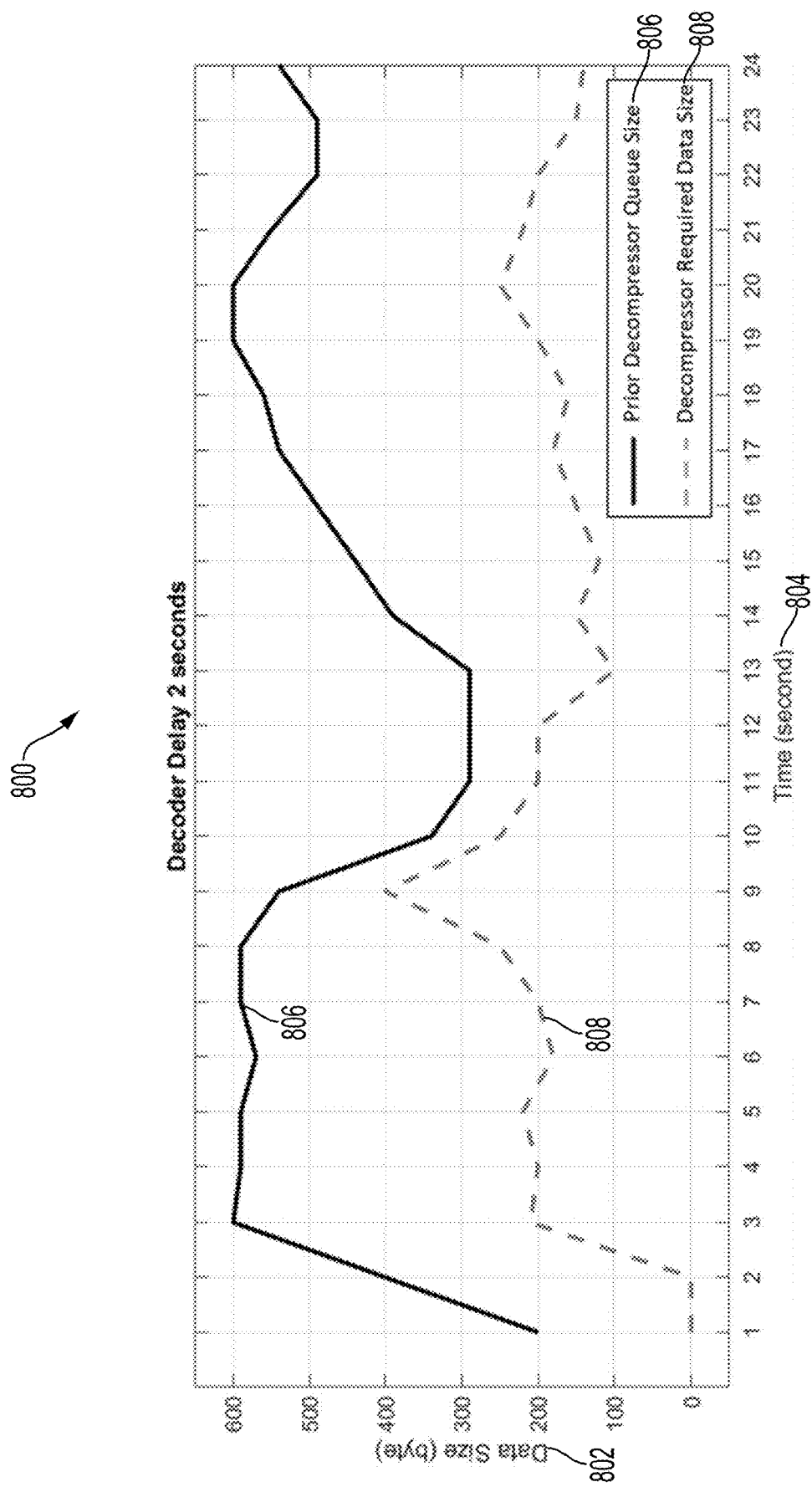
FIG. 8 illustrates an example graph of a telemetry scheme utilizing a decoder delay of two seconds, in accordance with aspects of the present disclosure.

FIG. 8 illustrates an example graph of a telemetry scheme utilizing a decoder delay of two seconds 800, in accordance with aspects of the present disclosure. The telemetry scheme graph 800 includes comparing a prior decompressor queue size 806 and a decompressor required data size 808 with respect to data size (bytes) 802 and time (seconds) 804.

Referring to FIG. 8, the telemetry scheme can set a telemetry bandwidth of 200 bytes/second and set a group time delay (e.g., decoder delay) of 2 seconds. For example, a prior decompressor data queue size $Q_{decompressor}^{Prior}(t)$ can be calculated with Equations (1)-(5) as provided above. The telemetry scheme graph 800 further includes plots of the prior decompressor data queue size 806 and the decompressor required data size 808, $L(t-\tau)$. $L(t-\tau)$ can be referred to as the data size of an acquisition at $t-\tau$ seconds. In some implementations, the decompressor required data size 808 can be the data size of an acquisition as described herein.

As illustrated in FIG. 8, the decompressor required data size 808 is less than the prior decompressor data queue size 806. This can indicate that the decompression process of the telemetry scheme of FIG. 8 is not going to be interrupted. If the curve of the prior decompressor data queue size 806 falls below the curve of the decompressor required data size 808, this may indicate that the decompression process will be interrupted or that the decompression process may fail. By utilizing the telemetry scheme of FIG. 8 along with a group time delay (τ) of two seconds, the required telemetry bandwidth has decreased from 400 bytes/second to 200 bytes/second, thereby providing a more efficient use of a limited telemetry bandwidth.

In some implementations, a decompressor data queue may be a continuous array. For example, if all of the data are transmitted successfully, the decompressor may begin decompressing from the first byte of an acquisition and automatically stop after the last byte of the acquisition. For the next decompressing process of the telemetry scheme as described herein, the decompressor can start where it stopped, which may be the first byte of a new acquisition. However, if the telemetry fails, a data package may be missed. For example, if the decompressor encounters a missing package, the decompression process may be interrupted and the decompressor may not necessarily stop at the end of the acquisition. In this example, the telemetry scheme may lose one or more acquisitions if the data of the corresponding acquisition is fully or partially in the missing data package. Thereafter, the decompressing process may have to recover after a telemetry failure by finding the starting byte of the next acquisition. To provide that information to the decompressor, the location of the first byte of an acquisition can be positioned at the beginning of telemetry data at each second. If more than one acquisition is contained in one second of telemetry data, one or more locations can also be added.

In other implementations, the telemetry scheme as described herein includes utilizing data compression that may cause the variable size of the data. If the raw/uncompressed data itself includes variable sizes from acquisition to acquisition, the telemetry scheme can be utilized without applying data compression. In this example, the compressor and decompressor can be data readers.

FIG. 9 illustrates an example table of iterations utilizing a time delay of one second 900, in accordance with aspects of the present disclosure. The table 900 includes illustrating calculated data for variables such as time 902, prior compressor queue size ($Q_{compressor}^{Prior}(t)$) 904, size of transmitted non-dummy data ($T_{non-dummy}(t)$) 906, size of data in a downhole compressor data queue after telemetry ($Q_{compressor}^{Post}(t)$) 908, prior compressor queue size ($Q_{compressor}^{Prior}(t)$) 910, data size of the acquisition at $t-\tau$ seconds ($L(t-\tau)$) 912, and post decompressor data queue size ($Q_{decompressor}^{Post}(t)$) 914.

In some implementations, the telemetry scheme system as described herein can include determining a delay (e.g., a group time delay), where the group time delay may be a minimized positive integer that satisfies the equation $Q_{decompressor}^{Prior}(t) \geq L(t-\tau)$ (as may be utilized in Eq. 5) at any given time t, from when t equals tau (τ) to when the last acquisition is logged in the well of the telemetry scheme system.

In other implementations, previous data may be utilized to predict the behavior of future data. For example, in a synthetic test, compressed data packet sizes can include:

| Acq. #/time | 1 | 2 | 3 | 4 | 5 | 6 | 7 | 8 | 9 | 10 | 11 | 12 |
|---|---|---|---|---|---|---|---|---|---|---|---|---|
| Size | 210 | 200 | 220 | 180 | 200 | 250 | 400 | 250 | 200 | 200 | 100 | 150 |
| | 13 | 14 | 15 | 16 | 17 | 18 | 19 | 20 | 21 | 22 | 23 | 24 |
| | 120 | 150 | 180 | 160 | 200 | 250 | 220 | 200 | 150 | 140 | 230 | 240 |

In this example, the telemetry scheme system can select a telemetry transmission rate of 200 bytes/sec as the average data size is 200 bytes. The telemetry scheme system can then determine a group time delay.

Initially, the telemetry scheme system can select the group time delay to be a minimal positive integer of one. The telemetry scheme system can then utilize Equations (1)-(5), iteratively.

In some implementations, an index can begin at one. Any variable with a non-positive index may not be present, while the value can be assigned as zero (e.g., $Q_{compressor}^{Post}(0)=0$, $L(-1)=0$, etc.)

At t=1 sec:

$$Q_{compressor}^{Prior}(1) = Q_{compressor}^{Post}(0) + L(1) = 0 + 210 = 210$$

$$T_{non-dummy}(1) = \min[T, Q_{compressor}^{Prior}(1)] = \min[200, 210] = 200$$

$$Q_{compressor}^{Post}(1) = \max[0, Q_{compressor}^{Prior}(1) - T_{non-dummy}(1)] = \max[0, 210-200] = 10$$

$$Q_{decompressor}^{Prior}(1) = Q_{decompressor}^{Post}(0) + T_{nondummy}(1) = 0 + 200 = 200$$

$$Q_{decompressor}^{Post}(1) = Q_{decompressor}^{Prior}(1) - L(1-\tau) = 200 - L(0) = 200 - 0 = 200$$

At $t=2$ sec:

$$Q_{compressor}^{Prior}(2) = Q_{compressor}^{Post}(1) + L(2) = 10 + 200 = 210$$

$$T_{non\text{-}dummy}(2) = \min[T, Q_{compressor}^{Prior}(2)] = \min[200, 210] = 200$$

$$Q_{compressor}^{Post}(2) = \max[0, Q_{compressor}^{Prior}(2) - T_{non\text{-}dummy}(2)] = \max[0, 210 - 200] = 10$$

$$Q_{decompressor}^{Prior}(2) = Q_{decompressor}^{Post}(1) + T_{non\text{-}dummy}(2) = 200 + 200 = 400$$

$$Q_{decompressor}^{Post}(2) = Q_{decompressor}^{Prior}(2) - L(2-\tau) = 400 - L(1) = 400 - 210 = 190$$

At $t=3$ sec:

$$Q_{compressor}^{Prior}(3) = Q_{compressor}^{Post}(2) + L(3) = 10 + 220 = 230$$

$$T_{non\text{-}dummy}(3) = \min[T, Q_{compressor}^{Prior}(3)] = \min[200, 230] = 200$$

$$Q_{compressor}^{Post}(3) = \max[0, Q_{compressor}^{Prior}(3) - T_{non\text{-}dummy}(3)] = \max[0, 230 - 200] = 30$$

$$Q_{decompressor}^{Prior}(3) = Q_{decompressor}^{Post}(2) + T_{non\text{-}dummy}(3) = 190 + 200 = 390$$

$$Q_{decompressor}^{Post}(3) = Q_{decompressor}^{Prior}(3) - L(3-\tau) = 390 - L(2) = 390 - 200 = 190$$

As the iterations continue, FIG. 9 illustrates the values of each variable 902, 904, 906, 908, 910, 912, 914, with the group time delay $\tau=1$.

At time $t=8$, $L(t-\tau)$ 912 $> Q_{decompressor}^{Prior}(t)$ 910. This represents a decompression process failure, thereby representing that a group time delay $\tau=1$ is not a large enough value to facilitate the telemetry scheme process.

FIG. 10 illustrates an example table of iterations utilizing a time delay of two seconds 1000, in accordance with aspects of the present disclosure. The table 1000 includes illustrating calculated data for variables such as time 1002, prior compressor queue size ($Q_{compressor}^{Prior}(t)$) 1004, size of transmitted non-dummy data ($T_{non\text{-}dummy}(t)$) 1006, size of data in a downhole compressor data queue after telemetry ($Q_{compressor}^{Post}(t)$) 1008, prior compressor queue size ($Q_{compressor}^{Prior}(t)$) 1010, data size of the acquisition at $t-\tau$ seconds ($L(t-\tau)$) 1012, and post decompressor data queue size ($Q_{decompressor}^{Post}(t)$) 1014.

In this example, a group time delay $\tau=2$ is utilized. The above-provided iterative process is then repeated:

At $t=1$ sec:

$$Q_{compressor}^{Prior}(1) = Q_{compressor}^{Post}(0) + L(1) = 0 + 210 = 210$$

$$T_{non\text{-}dummy}(1) = \min[T, Q_{compressor}^{Prior}(1)] = \min[200, 210] = 200$$

$$Q_{compressor}^{Post}(1) = \max[0, Q_{compressor}^{Prior}(1) - T_{non\text{-}dummy}(1)] = \max[0, 210 - 200] = 10$$

$$Q_{decompressor}^{Prior}(1) = Q_{decompressor}^{Post}(0) + T_{non\text{-}dummy}(1) = 0 + 200 = 200$$

$$Q_{decompressor}^{Post}(1) = Q_{decompressor}^{Prior}(1) - L(1-\tau) = 200 - L(-1) = 200 - 0 = 200$$

At $t=2$ sec:

$$Q_{compressor}^{Prior}(2) = Q_{compressor}^{Post}(1) + L(2) = 10 + 200 = 210$$

$$T_{non\text{-}dummy}(2) = \min[T, Q_{compressor}^{Prior}(2)] = \min[200, 210] = 200$$

$$Q_{compressor}^{Post}(2) = \max[0, Q_{compressor}^{Prior}(2) - T_{non\text{-}dummy}(2)] = \max[0, 210 - 200] = 10$$

$$Q_{decompressor}^{Prior}(2) = Q_{decompressor}^{Post}(1) + T_{non\text{-}dummy}(2) = 200 + 200 = 400$$

$$Q_{decompressor}^{Post}(2) = Q_{decompressor}^{Prior}(2) - L(2-\tau) = 400 - L(0) = 400 - 0 = 400$$

At $t=3$ sec:

$$Q_{compressor}^{Prior}(3) = Q_{compressor}^{Post}(2) + L(3) = 10 + 220 = 230$$

$$T_{non\text{-}dummy}(3) = \min[T, Q_{compressor}^{Post}(3)] = \min[200, 230] = 200$$

$$Q_{compressor}^{Post}(3) = \max[0, Q_{compressor}^{Prior}(3) - T_{non\text{-}dummy}(3)] = \max[0, 230 - 200] = 30$$

$$Q_{decompressor}^{Prior}(3) = Q_{decompressor}^{Post}(2) + T_{non\text{-}dummy}(3) = 400 + 200 = 600$$

$$Q_{decompressor}^{Post}(3) = Q_{decompressor}^{Prior}(3) - L(3-\tau) = 390 - L(1) = 600 - 210 = 390$$

As the iterations continue, FIG. 10 illustrates the values of each variable 1002, 1004, 1006, 1008, 1010, 1012, 1014, with the group time delay $\tau=2$.

At time $t=8$, $L(t-\tau) > Q_{decompressor}^{Prior}(t)$. This represents a decompression process failure, thereby representing that a group time delay $\tau=1$ is not a large enough value to facilitate the telemetry scheme process.

In this example, FIG. 10 illustrates that $L(t-\tau)$ 1012 is less than $Q_{decompressor}^{Prior}(t)$ 1010 at times 1-24. This demonstrates that the decompression process of the telemetry scheme process as described herein would not fail and that a group time delay $\tau=2$ is a sufficient value.

In the event that the 2-second delay is still not large enough (e.g., $L(t-\tau) > Q_{decompressor}^{Prior}(t)$), the telemetry scheme process can include increasing the group time delay to the next positive integer (e.g., $\tau=3$) and repeat the process provided above. In some implementations, the telemetry scheme process can include providing a pre-determined threshold (e.g., a group time delay that does not exceed a value of 10 seconds). During the iterative process, if the group time delay reaches the pre-determined threshold and $Q_{decompressor}^{Prior}(t)$ is not greater or equal to $L(t-\tau)$, the telemetry scheme process can include increasing a telemetry transmission rate.

Figure 11:
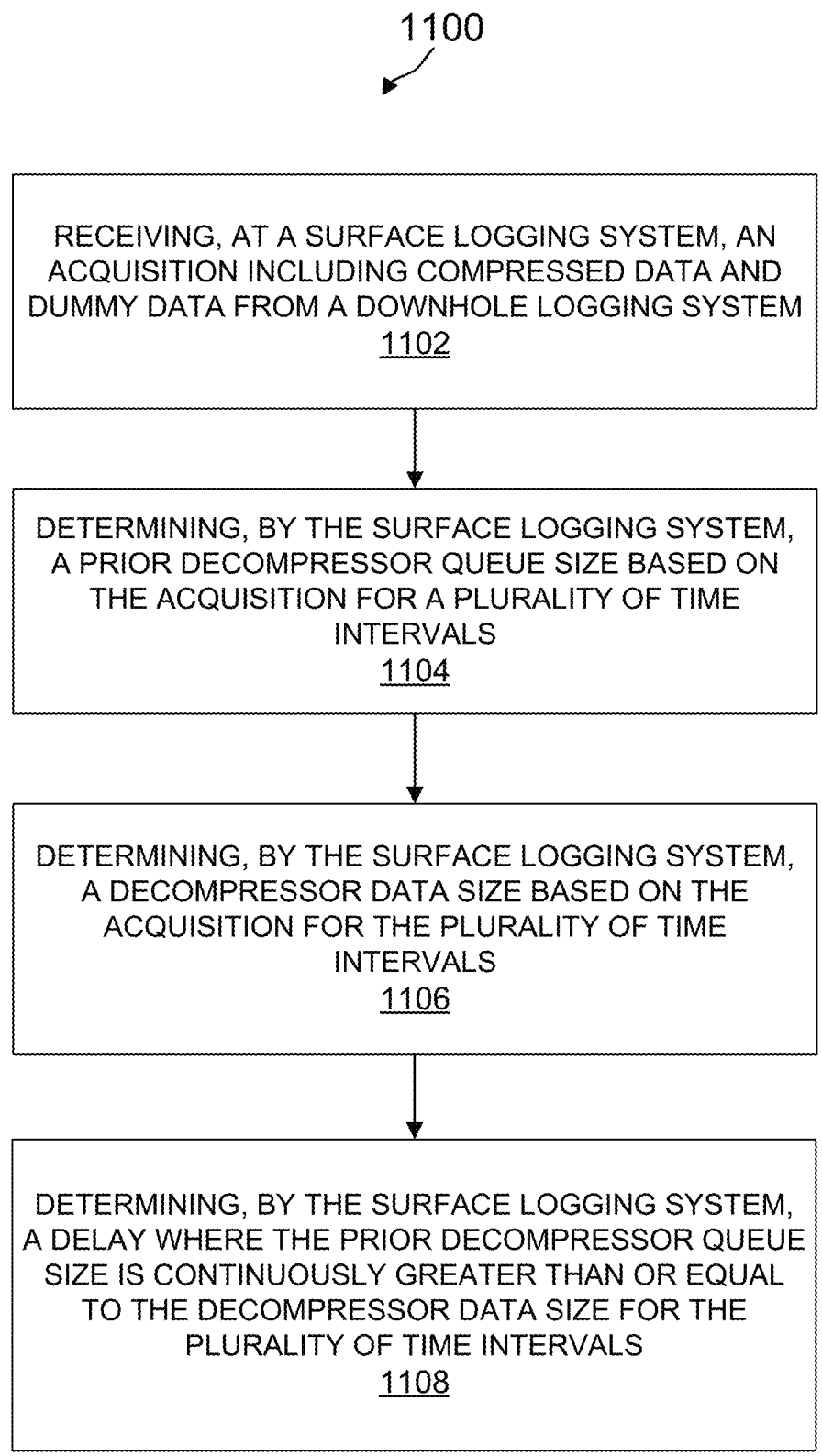
FIG. 11 shows an example process for optimizing telemetry schemes with a constant insensible group delay, in accordance with aspects of the present disclosure.

Having disclosed some example system components and concepts, the disclosure now turns to FIG. 11, which illustrate example method 1100 for optimizing telemetry schemes with a constant insensible group delay. The steps outlined herein are exemplary and can be implemented in any combination thereof, including combinations that exclude, add, or modify certain steps.

At step 1102, the method 1100 can include receiving, at a surface logging system, an acquisition including compressed data and dummy data from a downhole logging system.

At step 1104, the method 1100 can include determining, by the surface logging system, a prior decompressor queue size based on the acquisition for a plurality of time intervals. The prior decompressor queue size can be based on concatenated compressed data.

At step 1106, the method 1100 can include determining, by the surface logging system, a decompressor data size based on the acquisition for the plurality of time intervals. The decompressor data size can be based on a size of corresponding compressed data.

At step 1108, the method 1100 can include determining, by the surface logging system, a delay where the prior decompressor queue size is continuously greater than or equal to the decompressor data size for the plurality of time intervals. The delay can be a constant group time delay.

The method 1100 can further include determining, by the surface logging system, an average size of data packets associated with previously received data; and providing, by the surface logging system, a telemetry bandwidth based on the average size of the data packets to the downhole logging system. The method 1100 can also include determining whether the telemetry bandwidth is greater than the prior decompressor queue size. A size of the dummy data can be a size difference between the telemetry bandwidth and the compressed data when the telemetry bandwidth is greater than the prior decompressor queue size.

The method 1100 can further include, the delay being a period of time, and decompressing the compressed data that was compressed at a current time minus the period of time of the delay. For example, the compressed data to be decompressed can be the compressed data that was acquired and compressed at current time minus the delay (e.g., t–τ) seconds at downhole (e.g., downhole logging tool), and not the compressed data that is received at the current time minus the delay (e.g., t–τ) seconds at the surface (e.g., surface logging tool). The data acquired and compressed at (t–τ) seconds at downhole can be a complete acquisition, which may be the data that is decompressed by the surface logging tool.

Figure 12:
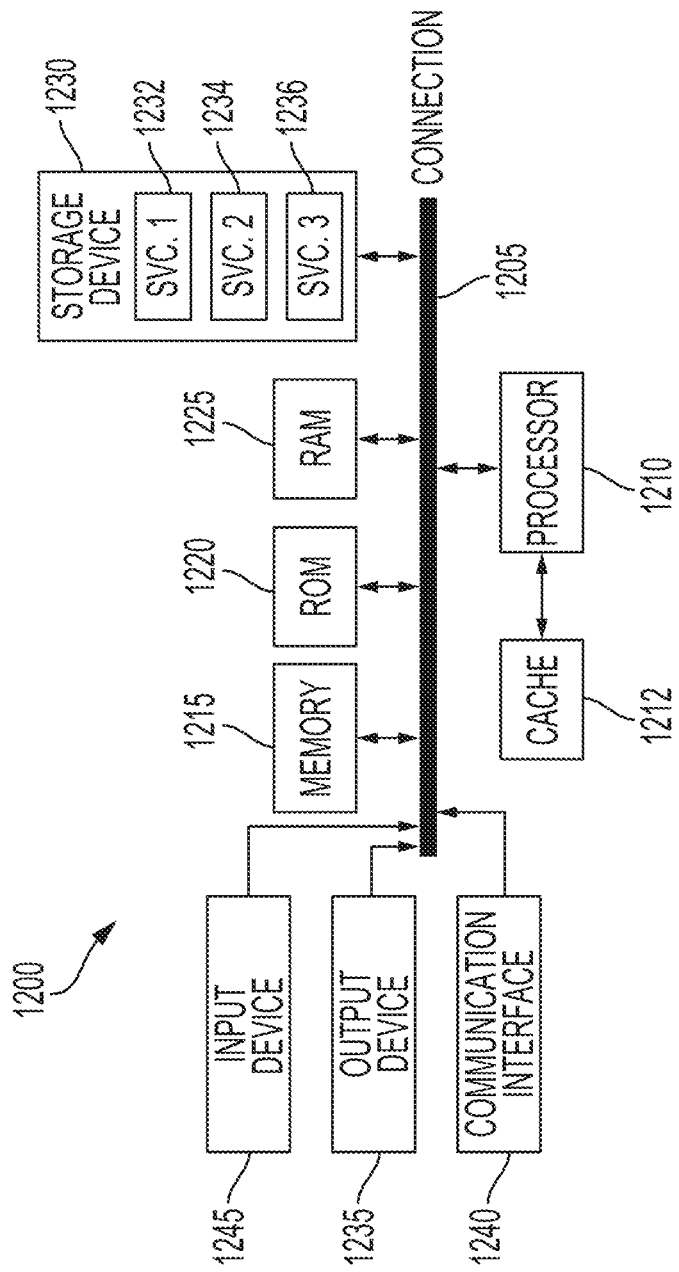
FIG. 12 illustrates an example computing device architecture that can be employed to perform various steps, methods, and techniques disclosed herein.

FIG. 12 illustrates an example computing device architecture 1200, which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 12 illustrates an example computing device architecture 1200 of a computing device, which can implement the various technologies and techniques described herein. The components of the computing device architecture 1200 are shown in electrical communication with each other using a connection 1205, such as a bus. The example computing device architecture 1200 includes a processing unit (CPU or processor) 1210 and a computing device connection 1205 that couples various computing device components including the computing device memory 1215, such as read only memory (ROM) 1220 and random access memory (RAM) 1225, to the processor 1210.

The computing device architecture 1200 can include a cache of high-speed memory connected directly with, in close proximity to, or integrated as part of the processor 1210. The computing device architecture 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other computing device memory 1215 may be available for use as well. The memory 1215 can include multiple different types of memory with different performance characteristics. The processor 1210 can include any general purpose processor and a hardware or software service, such as service 1 1232, service 2 1234, and service 3 1236 stored in storage device 1230, configured to control the processor 1210 as well as a special-purpose processor where software instructions are incorporated into the processor design. The processor 1210 may be a self-contained system, containing multiple cores or processors, a bus, memory controller, cache, etc. A multi-core processor may be symmetric or asymmetric.

To enable user interaction with the computing device architecture 1200, an input device 1245 can represent any number of input mechanisms, such as a microphone for speech, a touch-sensitive screen for gesture or grail input, keyboard, mouse, motion input, speech and so forth. An output device 1235 can also be one or more of a number of output mechanisms known to those of skill in the art, such as a display, projector, television, speaker device, etc. In some instances, multimodal computing devices can enable a user to provide multiple types of input to communicate with the computing device architecture 1200. The communications interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. The storage device 1230 can include services 1232, 1234, 1236 for controlling the processor 1210. Other hardware or software modules are contemplated. The storage device 1230 can be connected to the computing device connection 1205. In one aspect, a hardware module that performs a particular function can include the software component stored in a computer-readable medium in connection with the necessary hardware components, such as the processor 1210, connection 1205, output device 1235, and so forth, to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data, which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method for optimizing a telemetry scheme, the method comprising: receiving, at a surface logging system, an acquisition including compressed data and dummy data from a downhole logging system; determining, by the surface logging system, a prior decompressor queue size based on the acquisition for a plurality of time intervals; determining, by the surface logging system, a decompressor data size based on the acquisition for the plurality of time intervals; and determining, by the surface logging system, a delay where the prior decompressor queue size is continuously greater than or equal to the decompressor data size for the plurality of time intervals.

Statement 2: The method of Statement 1, wherein the prior decompressor queue size is based on concatenated compressed data.

Statement 3: The method of any of Statements 1 to 2, wherein the decompressor data size is based on a size of corresponding compressed data.

Statement 4: The method of any of Statements 1 to 3, wherein the delay is a period of time; and further comprising decompressing the compressed data that was compressed at a current time minus the period of time of the delay.

Statement 5: The method of any of Statements 1 to 4, further comprising: determining, by the surface logging system, an average size of data packets associated with previously received data; and providing, by the surface logging system, a telemetry bandwidth based on the average size of the data packets to the downhole logging system.

Statement 6: The method of any of Statements 1 to 5, further comprising determining whether the telemetry bandwidth is greater than the prior decompressor queue size.

Statement 7: The method of any of Statements 1 to 6, wherein a size of the dummy data is a size difference between the telemetry bandwidth and the compressed data when the telemetry bandwidth is greater than the prior decompressor queue size.

Statement 8: A system for optimizing a telemetry scheme, the system comprising: one or more processors; and at least one computer-readable storage medium having stored therein instructions which, when executed by the one or more processors, cause the system to: receive an acquisition including compressed data and dummy data from a downhole logging system; determine a prior decompressor queue size based on the acquisition for a plurality of time intervals; determine a decompressor data size based on the acquisition for the plurality of time intervals; and determine a delay where the prior decompressor queue size is continuously greater than or equal to the decompressor data size for the plurality of time intervals.

Statement 9: The system of Statement 8, wherein the prior decompressor queue size is based on concatenated compressed data.

Statement 10: The system of any of Statements 8 to 9, wherein the decompressor data size is based on a size of corresponding compressed data.

Statement 11: The system of any of Statements 8 to 10, wherein the delay is a period of time; and wherein the instructions, when executed by the one or more processors, further cause the system to decompress the compressed data that was compressed at a current time minus the period of time of the delay.

Statement 12: The system of any of Statements 8 to 11, wherein the instructions, when executed by the one or more processors, further cause the system to: determine an average size of data packets associated with previously received data; and provide a telemetry bandwidth based on the average size of the data packets to the downhole logging system.

Statement 13: The system of any of Statements 8 to 12, wherein the instructions, when executed by the one or more processors, further cause the system to determine whether the telemetry bandwidth is greater than the prior decompressor queue size.

Statement 14: The system of any of Statements 8 to 13, wherein a size of the dummy data is a size difference between the telemetry bandwidth and the compressed data when the telemetry bandwidth is greater than the prior decompressor queue size.

Statement 15: A non-transitory computer-readable storage medium comprising: instructions stored on the non-transitory computer-readable storage medium, the instructions, when executed by one or more processors, cause the one or more processors to: receive an acquisition including compressed data and dummy data from a downhole logging system; determine a prior decompressor queue size based on the acquisition for a plurality of time intervals; determine a decompressor data size based on the acquisition for the plurality of time intervals; and determine a delay where the prior decompressor queue size is continuously greater than or equal to the decompressor data size for the plurality of time intervals.

Statement 16: The non-transitory computer-readable storage medium of Statement 15, wherein the prior decompressor queue size is based on concatenated compressed data.

Statement 17: The non-transitory computer-readable storage medium of any of Statements 15 to 16, wherein the decompressor data size is based on a size of corresponding compressed data.

Statement 18: The non-transitory computer-readable storage medium of any of Statements 15 to 17, wherein the instructions, when executed by the one or more processors, further cause the one or more processors to: determine an average size of data packets associated with previously received data; and provide a telemetry bandwidth based on the average size of the data packets to the downhole logging system.

Statement 19: The non-transitory computer-readable storage medium of any of Statements 15 to 18, wherein the instructions, when executed by the one or more processors, further cause the one or more processors to determine whether the telemetry bandwidth is greater than the prior decompressor queue size.

Statement 20: The non-transitory computer-readable storage medium of any of Statements 15 to 19, wherein a size of the dummy data is a size difference between the telemetry bandwidth and the compressed data when the telemetry bandwidth is greater than the prior decompressor queue size.

What is claimed is:

1. A method for optimizing a telemetry scheme, the method comprising:
   gathering, by a downhole logging system, raw data of a downhole environment;
   determining, by the downhole logging system, whether to add dummy data to compressed data of the raw data based on a telemetry bandwidth for transmitting the compressed data to a surface logging system in relation to a prior compressor queue size associated with the downhole logging system;
   adding, by the downhole logging system, the dummy data to the compressed data of the raw data based on the telemetry bandwidth for transmitting the compressed data in relation to the prior compressor queue size associated with the downhole logging system;
   transmitting the compressed data with the dummy data from the downhole logging system to the surface logging system;
   receiving, at the surface logging system, an acquisition including the compressed data of the raw data and the dummy data from the downhole logging system;
   determining, by the surface logging system, a prior decompressor queue size based on the acquisition for a plurality of time intervals;
   determining, by the surface logging system, a decompressor data size based on the acquisition for the plurality of time intervals;
   determining, by the surface logging system, a delay where the prior decompressor queue size is continuously greater than or equal to the decompressor data size for the plurality of time intervals; and
   decompressing, at the surface logging system, the acquisition based on the delay.

2. The method of claim 1, wherein the prior decompressor queue size is based on concatenated compressed data.

3. The method of claim 1, wherein the decompressor data size is based on a size of corresponding compressed data.

4. The method of claim 1, wherein the delay is a period of time; and
   further comprising decompressing the compressed data that was compressed downhole by the downhole logging system at a current time at the surface logging system minus the period of time of the delay.

5. The method of claim 1, further comprising:
   determining, by the surface logging system, an average size of data packets associated with previously received data; and
   providing, by the surface logging system, the telemetry bandwidth based on the average size of the data packets to the downhole logging system.

6. The method of claim 5, further comprising determining whether the telemetry bandwidth is greater than the prior decompressor queue size.

7. The method of claim 6, wherein a size of the dummy data is a size difference between the telemetry bandwidth and the compressed data when the telemetry bandwidth is greater than the prior decompressor queue size.

8. A system for optimizing a telemetry scheme, the system comprising:
   one or more processors; and
   at least one computer-readable storage medium having stored therein instructions which, when executed by the one or more processors, cause the system to:
      gather, by a downhole logging system, raw data of a downhole environment;
      determine, by the downhole logging system, whether to add dummy data to compressed data of the raw data based on a telemetry bandwidth for transmitting the compressed data to a surface logging system in relation to a prior compressor queue size associated with the downhole logging system;
      add, by the downhole logging system, the dummy data to the compressed data of the raw data based on the telemetry bandwidth for transmitting the compressed data in relation to the prior compressor queue size associated with the downhole logging system;
      transmit the compressed data with the dummy data from the downhole logging system to the surface logging system;
      receive, at the surface logging system, an acquisition including the compressed data of the raw data and the dummy data from the downhole logging system;
      determine a prior decompressor queue size based on the acquisition for a plurality of time intervals;
      determine a decompressor data size based on the acquisition for the plurality of time intervals;
      determine a delay where the prior decompressor queue size is continuously greater than or equal to the decompressor data size for the plurality of time intervals; and
      decompress, at the surface logging system, the acquisition based on the delay.

9. The system of claim 8, wherein the prior decompressor queue size is based on concatenated compressed data.

10. The system of claim 8, wherein the decompressor data size is based on a size of corresponding compressed data.

11. The system of claim 8, wherein the delay is a period of time; and wherein the instructions, when executed by the one or more processors, further cause the system to decompress the compressed data that was compressed downhole by the downhole logging system at a current time at the surface logging system minus the period of time of the delay.

12. The system of claim 8, wherein the instructions, when executed by the one or more processors, further cause the system to:
determine an average size of data packets associated with previously received data; and
provide a telemetry bandwidth based on the average size of the data packets to the downhole logging system.

13. The system of claim 12, wherein the instructions, when executed by the one or more processors, further cause the system to determine whether the telemetry bandwidth is greater than the prior decompressor queue size.

14. The system of claim 13, wherein a size of the dummy data is a size difference between the telemetry bandwidth and the compressed data when the telemetry bandwidth is greater than the prior decompressor queue size.

15. A non-transitory computer-readable storage medium comprising:
instructions stored on the non-transitory computer-readable storage medium, the instructions, when executed by one or more processors, cause the one or more processors to:
gather, by a downhole logging system, raw data of a downhole environment;
determine, by the downhole logging system, whether to add dummy data to compressed data of the raw data based on a telemetry bandwidth for transmitting the compressed data to a surface logging system in relation to a prior compressor queue size associated with the downhole logging system;
add, by the downhole logging system, the dummy data to the compressed data of the raw data based on the telemetry bandwidth for transmitting the compressed data in relation to the prior compressor queue size associated with the downhole logging system;
transmit the compressed data with the dummy data from the downhole logging system to the surface logging system;
receive, at the surface logging system, an acquisition including the compressed data of the raw data and the dummy data from the downhole logging system;
determine a prior decompressor queue size based on the acquisition for a plurality of time intervals;
determine a decompressor data size based on the acquisition for the plurality of time intervals;
determine a delay where the prior decompressor queue size is continuously greater than or equal to the decompressor data size for the plurality of time intervals; and
decompress, at the surface logging system, the acquisition based on the delay.

16. The non-transitory computer-readable storage medium of claim 15, wherein the prior decompressor queue size is based on concatenated compressed data.

17. The non-transitory computer-readable storage medium of claim 15, wherein the decompressor data size is based on a size of corresponding compressed data.

18. The non-transitory computer-readable storage medium of claim 15, wherein the instructions, when executed by the one or more processors, further cause the one or more processors to:
determine an average size of data packets associated with previously received data; and
provide a telemetry bandwidth based on the average size of the data packets to the downhole logging system.

19. The non-transitory computer-readable storage medium of claim 18, wherein the instructions, when executed by the one or more processors, further cause the one or more processors to determine whether the telemetry bandwidth is greater than the prior decompressor queue size.

20. The non-transitory computer-readable storage medium of claim 19, wherein a size of the dummy data is a size difference between the telemetry bandwidth and the compressed data when the telemetry bandwidth is greater than the prior decompressor queue size.

* * * * *